US007229011B2

(12) United States Patent
Hansen et al.

(10) Patent No.: US 7,229,011 B2
(45) Date of Patent: *Jun. 12, 2007

(54) MONEY TRANSFER SYSTEMS AND METHODS FOR TRAVELERS

(75) Inventors: Kurt L. Hansen, Parker, CO (US);
Dean A. Seifert, Foxrock Dublin (IE);
Mark Thompson, Denver, CO (US);
Mike Michelsen, Arvada, CO (US)

(73) Assignees: The Western Union Company, Englewood, CO (US); First Data Corporation, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/467,465

(22) Filed: Aug. 25, 2006

(65) Prior Publication Data

US 2007/0007332 A1 Jan. 11, 2007

Related U.S. Application Data

(63) Continuation of application No. 10/206,661, filed on Jul. 26, 2002, now Pat. No. 7,104,440, which is a continuation-in-part of application No. 10/040,568, filed on Jan. 4, 2002, now Pat. No. 6,814,282, and a continuation-in-part of application No. 10/037,827, filed on Jan. 3, 2002, and a continuation-in-part of application No. 09/975,171, filed on Oct. 10, 2001, which is a continuation-in-part of application No. 09/427,249, filed on Oct. 26, 1999, now Pat. No. 6,488,203.

(51) Int. Cl.
*G06F 17/60* (2006.01)

(52) U.S. Cl. ..................................... 235/379; 235/380

(58) Field of Classification Search ................ 235/379, 235/380, 382; 902/8, 20; 705/17, 39, 43, 705/64
See application file for complete search history.

(56) References Cited

U.S. PATENT DOCUMENTS

| 5,448,043 | A | * | 9/1995 | Nakano et al. .............. 235/379 |
| 5,937,396 | A | * | 8/1999 | Konya .......................... 705/43 |
| 6,206,283 | B1 | * | 3/2001 | Bansal et al. ................ 235/379 |
| 6,415,271 | B1 | * | 7/2002 | Turk et al. ..................... 705/39 |
| 6,814,282 | B2 | * | 11/2004 | Seifert et al. ................ 235/379 |

* cited by examiner

*Primary Examiner*—Daniel Stcyr
(74) *Attorney, Agent, or Firm*—Townsend and Townsend and Crew LLP

(57) ABSTRACT

One method involves payment of money to a recipient traveling to one or more foreign countries by entering into a remote computer money transfer information from a sender. The money transfer information comprises recipient identification information, at least one country where the money is to be received, and a payment amount in an originating currency. The money transfer information is transmitted to a host computer system. When ready to receive payment in the designated country, recipient identification information along with a request to withdraw a portion of a possible payment amount is entered into a payout computer. The recipient identification information and the request to withdraw is transmitted to a host computer system, and the requested withdrawal is provided to the recipient in the local currency.

21 Claims, 12 Drawing Sheets

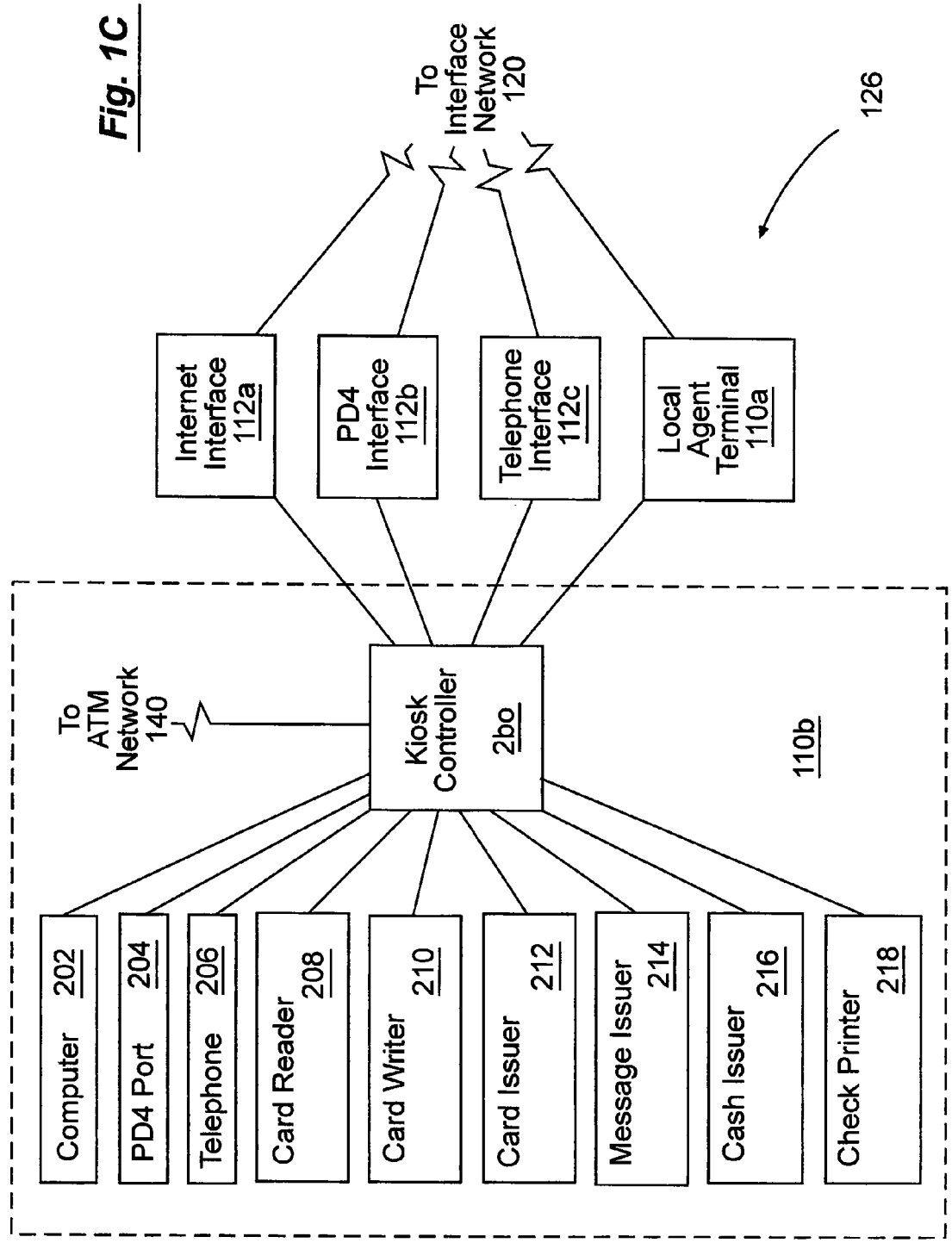

MONEY TRANSFER SYSTEMS AND METHODS FOR TRAVELERS

CROSS-REFERENCES TO RELATED APPLICATIONS

This application is a continuation of U.S. patent application Ser. No. 10/206,661, filed Jul. 26, 2002 now U.S. Pat. No. 7,104,440, and entitled "Money Transfer Systems and Methods for Travelers", which is a continuation in part application and claims the benefit of U.S. patent application Ser. No. 10/040,568, filed Jan. 4, 2002 now U.S. Pat. No. 6,814,282, which is a continuation in part of U.S. patent application Ser. No. 09/427,249, filed Oct. 26, 1999 now U.S. Pat. No. 6,488,203 and U.S. patent application Ser. No. 09/975,171, filed Oct. 10, 2001, entitled "Method and System for Performing Money Transactions", and U.S. patent application Ser. No. 10/037,827, filed Jan. 3, 2002, entitled "Methods for Receiving Electronically Transferred Funds Using an Automated Teller Machine", the complete disclosures of which are herein incorporated by reference.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to computer-implemented transfer systems including systems and methods for introducing information to and receiving information from a computer-implemented transfer system. More specifically, the invention relates to transferring value and/or messages associated with the value via a computer-implemented transfer system.

Various mechanisms exist for transferring information across a computer network. For example, email may be sent from one person to another across a computer network or money may be transferred across a computer network from one account to another. However, each of the existing transfer mechanisms require both a sender and a receiver involved in the transfer to have access to a common transfer medium. Thus, as an example, to transfer information across an email system both the sender and receiver must have access to an email account. Similarly, to transfer money from one account to another both the receiver and the sender must have accessible accounts. In many instances, the receiver and the sender do not have access to common systems and therefor must use alternative means to transfer information including, for example, the United States postal system.

Furthermore, even where both the receiver and the sender share access to a common transfer medium, use of the medium is often cumbersome causing senders to use alternative means to transfer information and/or value. For example, a business and its suppliers may both have bank accounts making a money transfer possible, however, it is typical for a business to issue checks and send them through the United States postal service to pay the suppliers.

Thus, there exists a need in the art to increase accessibility to provide increased access to computer-implemented transfer systems and reduce the cumbersome nature of such transfer systems. These and other deficiencies in the prior art are addressed by the present invention.

BRIEF SUMMARY OF THE INVENTION

The invention provides a wide variety of money transfer systems, components of such money transfer systems, and methods for electronically transferring money. Broadly speaking, the invention permits money to be received in some form and then electronically transferred to another location where it is available for pickup. A wide variety of systems and techniques may be used to access the money transfer system, to provide the money to the money transfer system to transfer the money, and to pay out the transferred money to a recipient.

For example, the money transfer system may be accessed by walking into a money transfer or provider location and tendering payment, using a telephone to contact an IVR system or a customer service representative, over the Internet using any type of device capable of communicating over the Internet, including personal computers, cell phones with browsers, PDAs and the like. Conveniently, payment may be tendered in cash, by credit card, debit card, stored value cards, including smart cards, using an Automated Clearing House (ACH) transfer from a bank account, using a cash card that is presentable at a provider terminal or point of sale device to receive cash, and the like. The recipient may be paid by cash, check, by crediting a bank account, crediting of a stored value card, and the like. Further various payment techniques may be used, such as in person at a money transfer location (i.e. an entity working on behalf of a financial institution to transfer funds), by an ACH transfer to a bank account, by a Fed wire to a bank account, using ATMs, kiosks, stored value cards, automated check printers, and the like.

One particular method involves the use of stored value account that may be used, for example, to make internet payments, and that can be credited using a variety of payment techniques. Such a method involves receiving money at a money transfer location from a potential purchaser. The money is then stored as an electronic record in a stored value account of the purchaser. This money is then available for transfer at the request of the purchaser. Upon such a request, the money may be electronically sent to a recipient and the stored value account may be debited.

For example, the money transfer location may include a device that is communicable with a host computer so that the stored value account may be stored in the host computer. The purchaser may then make the request to transfer money using any type of computer that may communicate with a server computer over the Internet. In this way, a purchaser who wishes not to provide financial information over the Internet may create a stored value account using traditional techniques, such as making a cash payment at a money transfer location. These funds are then available to be used over the Internet without disclosing financial information.

By permitting funds to be received at a money transfer location, a variety of payment types may be used. For example, payments may be made by cash, checks, credit cards, debit cards, and the like.

The invention provides another method for transferring money from a sender to a recipient while permitting the recipient to receive the money in a variety of payment forms and/or at different times. According to the method, money is received from the sender (e.g., at a money transfer location) along with information on the recipient that is to receive the money. An electronic record of the money and the intended recipient is created, and the recipient is provided with various payment options for receiving the money. The recipient then requests payment using one or more of the payment options, and payment is made according to the requested payment option. An electronic record of the payment is also created.

Examples of payment options include a cash pick up at a provider location, a hand delivery to the recipient in cash, a hand delivery to the recipient in a money order, a crediting of an account of the recipient, a debit or stored value card, and the like. Further, the request to receive the payment may be made in a variety of ways, such as by a telephone request, by a computer request over a network, by a letter, by an in-person visit, by a voice response unit request, by a personal digital assistant request, and the like.

In one aspect, the card comprises a closed-loop debit card. Such a debit card may be used at any location that is configured to accept such a card. For example, the debit card may comprise an anonymous debit card, e.g. one associated with MasterCard, VISA, Discover, and the like, that is initialized when the request for payment by the recipient is made. As another example, the debit card may comprise a stored value card that is loaded with a record of the value upon request for payment by the recipient. As a further example, the debit card may comprise a phone card or an internet cash card. These cards may be loaded with phone minutes or other value as payment to the recipient.

When issuing a card at the time of payment, the debit card may be initialized using a point of sale device to associate an account of the debit card with the electronic record of the money. As an alternative, a receipt may be printed with a point of sale device that has account information that is associated with the electronic record of the money. In some cases, the receipt may be used in place of the debit card. For example, the receipt may include an identifier that may be used when making internet purchases. As another example, the receipt may comprise a sticker having the account information that is placed onto a debit card.

The transferred money may be deposited into a wide variety of accounts. For example, the money may be transferred into a bank account of the recipient upon presentment of an account number or a MICR number from a check of the recipient. As another example, the money may be deposited into an on-line funds account, such as an on-line money transfer account, an on-line bank account, an on-line investment account, an on-line auction account, and the like. As a further example, the money may be transferred into a bank account of the recipient by providing a debit card and performing a reverse or return transaction using a point of sale device. As yet another example, the recipient may receiver a sender key and a confirmation code from the sender. This information may be input into an appropriate ATM or kiosk device to receive the transferred money.

When using a point of sale device to pay to accounts using an account number, a variety of equipment may be used. For example, the account information may be obtained from a MICR reader that reads a MICR line from a check of the recipient, a mag stripe card reader that reads a mag stripe from a card of the recipient, a keypad that permits manual entry of the account information, an OCR scanner or imager that reads the account from a statement of the recipient, a biometrics device that identifies a pre-registered recipient who is tied to the account, and the like.

In one aspect, the recipient may be provided with a list of fees associated with each type of payment option. Such a method also allows for the splitting of transaction costs between the sender and the recipient. For example, the sender may pay all or part of the transaction fees and the recipient may pay all or part of the transaction fees in any proportion. Further, the payment of transaction fees may be decided solely by the sender, by the recipient, or by mutual agreement.

The recipient may also be provided with the option of receiving portions of the money at different times. In this way, the recipient does not need to pick up the transferred money at a single time. If the recipient requests payment of the money at multiple times, an electronic record may be made for each partial payment. Further, transaction fees may be deducted each time a partial payment is made.

Conveniently, the recipient may be sent a message with the payment options. This message may be an e-mail, a letter, a telephone call, a facsimile, a telegram, or the like.

As one specific example of such an embodiment, the invention provides systems and methods for transferring money to a recipient that is traveling in one or more foreign countries. The recipient may withdraw the funds in partial payments that are in the local currency. The money may be input into the system using a remote computer, such as one that is located at a money transfer location. Along with the payment, other information may be entered, such as recipient identification information, one or more countries where the money is to be received, the payment amount, and the like. This information may be transmitted to a host computer system. When ready to receive a payment in one of the designated countries, a recipient proceeds to a payout location having a remote computer that may communicate with the host computer system. Information such as the recipient's identification information and a payout amount is entered into the remote computer for transmission to the host computer system. If accepted, the recipient may be paid the amount in the local currency. The host computer system may also calculate any fees and reduce the remaining principal by that amount. Further, the host computer system may keep a record of the transaction including the exchange rate used when converting to the local currency.

In a further embodiment, the invention provides a method for transferring money from a sender to a recipient by receiving money from the sender along with information on the recipient that is to receive the money. The sender also indicates that the money is to be stored on a stored value card. An electronic record of the money and the intended recipient is also created. When ready to receive the money, the recipient makes a request, and a stored value card is generated having the value of the money. An electronic record of the payment is also electronically stored.

The invention further provides an exemplary system and method for facilitating the transfer of value. According to the method, a host computer system is employed to receive a request from a sender to transfer value. This request may be transmitted from a remote computer or point of sale device. The host computer system is in turn employed to transmit a computer readable document back to the remote computer requesting information on the requested transfer. Alternatively, the remote computer may be configured to prompt the sender for such information without accessing the host computer system. The requested information is received back at the host computer system that in turn determines one or more options for transferring the value based on the received information regarding the transfer. The host computer system may then transmit a computer readable document containing at least one of the options to the remote computer. In this way, a sender is able to provide information on a transfer request and receive back a recommended way to transfer the value.

As one specific example, such a process may be used for bill payment services. For instance, a customer may request to pay a bill and provide information on their account as well as a payment instrument. The payment instrument may be evaluated during a pre-authorization step to insure funds are available. Further, based on the payment instrument provided, a list of possible payment options may be displayed at the remote computer. For example, the customer may have the option of paying by a real time guaranteed funds payment, such as by cash, a credit card payment, a debit card payment, a PIN-less debit card payment, an ACH payment, a payment by check, or the like. Further, fees associated with each option may be displayed to the customer.

To provide a recommended transfer technique, the host computer system may request a variety of information on the transfer. For example, such requested information may include personal information about a recipient of the value, value receiving interfaces available to a recipient of the value, pick-up locations available to the recipient of the value, and the like. The host computer system may select a recommended transfer option from a wide variety of options. Such options may include, for example, a transfer to a money handling location, a transfer to a financial kiosk, a transfer to a cash dispensing machine, a transfer to a financial account, a transfer by way of a negotiable instrument, a transfer to a stored value card, and the like. In some cases, the host computer system may transmit a computer readable document containing a list of all possible options for transferring the value. In this way, the sender may simply select one of the options.

A further embodiment of the invention provides a system and method for transferring value where certain restrictions may be placed on the transfer. According to the method, a host computer system is employed to receive a request to transfer value to multiple recipients along with one or more restrictions about how the value may be received by the recipients. The host computer system may also receive a request to provide the value to one or more of the recipients. The host computer system may then be employed to determine the manner of the transfer based on the restriction.

Hence, based on the restriction, the transfer may be made. This may occur, for example, by transmitting a computer readable document from the host computer system giving instructions on how to pay out the value according to the restriction. Also, the host computer system may receive and stored information on how the value was provided to the recipients so that a record of the manner of payment may be made.

The sender may utilize a wide variety of restrictions. For example, such restrictions may require that a portion of the value be provided to each recipient or may require a set a time limit for when the value may be received. As other examples, the restriction may be a designation as to the form of value or a designation as to which of the recipients must be present when receiving the value.

In one embodiment, the invention accommodates situations where an individual, small enterprise or the like has a periodic or short term need to receive multiple payments or money transfers in an efficient manner. To facilitate such a need, in one embodiment a method is provided for paying for goods or services using a network. According to the method, account information on a payee is input into a money transfer system. Further, at least one restriction is placed on transfers into the account from one or more payors, and the restriction is stored in the money transfer system. A cash payment may then be received at a money transfer location from at least one payor to pay for a good or service offered by the payee. A record may also be sent to the money transfer system over a network indicating that the cash payment has been made. Funds may then be transferred to the account of the payee over the network based on the cash payment using the money transfer system. In this way, a payee may establish a special, limited relationship with the money transfer system to permit payors to pay the payee according to the limitations placed within the system.

For instance, the restrictions may be those such as a limit on the number of allowed transfers into the account of the payee, a time period for making transfers into the account of the payee, the amount of each transfer into the account of the payee, and the like. Conveniently, the funds may be transferred using an ACH transfer, a check, or the like. Further, a record of payment to the payee from the money transfer system may be transmitted to the payee so that the goods or services may be provided. For instance, an item may be shipped from the payee to the payor after receipt of the record of payment. Optionally, a transaction fee may be collected along with the payment.

These and other embodiments of the present invention are described in more detail in conjunction with the text below and attached figures.

BRIEF DESCRIPTION OF THE DRAWINGS

A more complete understanding of the present invention may be derived by referring to the detailed description and claims when considered in connection the figures, wherein like reference numbers refer to similar items throughout the figures, and:

FIG. 1C illustrates the input mechanisms of the network of FIG. 1A.

DETAILED DESCRIPTION OF THE INVENTION

The invention provides various equipment and techniques for moving money. The invention permits money to be received in some form and then electronically transferred to another location where it available for pickup or further processing. In order to make a money transfer transaction, an interface with the money transfer system is needed. Accordingly, a wide variety of interfaces may be used to access the money transfer system. For example, the money transfer system may be accessed by walking into a money transfer or provider location and tendering payment, using a telephone to contact an IVR system or a customer service representative, over the Internet using any type of device capable of communicating over the Internet, including personal computers, cell phones with browsers, PDAs and the like. These interfaces may be accessed by both the sender and the recipient.

The invention further permits a wide variety of payment instruments to be used to tender payment. For instance, payment may be tendered in cash, by credit card, debit card, stored value cards, including smart cards, using an Automated Clearing House (ACH) transfer from a bank account, using a cash card, and the like. Similarly, a wide variety of payment techniques may be used once the money has been transferred. For instance, the recipient may be paid by cash, by check, by money order, by crediting a bank account, by crediting a stored value card or stored value record, and the like. Further various payment techniques may be used to provide the recipient with the money. These include permitting the recipient to personally receive the money at a money transfer location, by an ACH transfer to a bank account, by a Fed wire to a bank account, using ATMs, kiosks, stored value cards, automated check printers, and the like. Optionally, the funds may be received in portions and in different currencies. For instance, a traveler may transfer money to himself before leaving on a trip, and designate countries where the money will be picked up along with identification information.

Various combinations of the above may be practiced according to the invention. For example, any of the access methods may be used with any of methods for tendering of payment or receiving payment. Further, any of the above may be used with any of the payment devices. Moreover, a recipient may be used to access the system in order to request money from one or more senders.

Figure 1A:
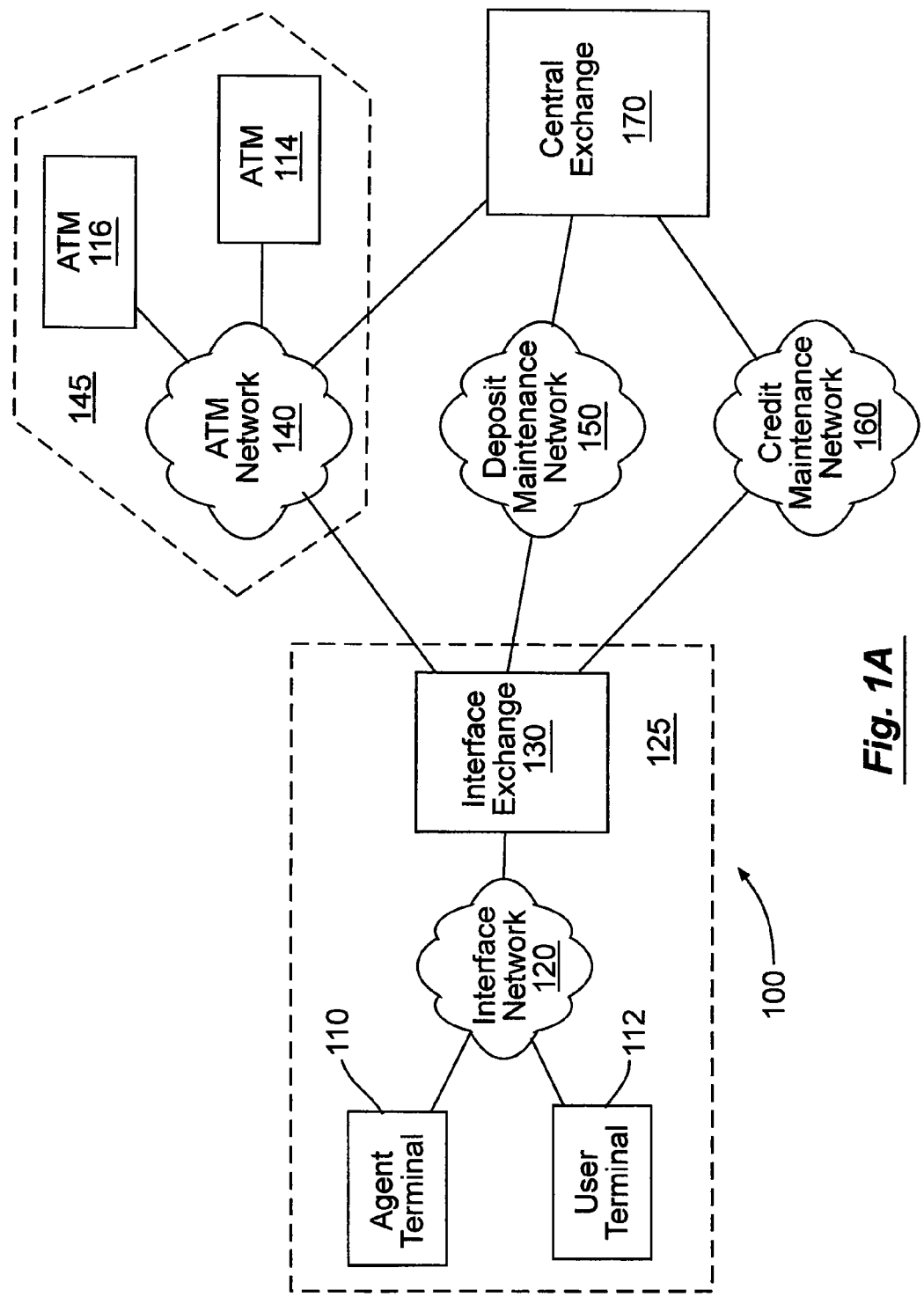
FIG. 1A illustrates an embodiment of a transfer network including input and output mechanisms according to the present invention.

Referring to FIG. 1A, one embodiment of a transfer system 100 according to the present invention is described. Transfer system 100 is comprised of an interface system 125, an automatic teller system ("ATM") system 145, a deposit maintenance network 150, a credit maintenance network 160 and a central exchange 170. Interface system 125 is communicably coupled to ATM system 145 via an ATM network 140, deposit maintenance network 150 and credit maintenance network 160. In general, interface system 125 unifies a variety of transfer systems while supporting a variety of mechanisms for introducing and receiving information to and/or from transfer system 100.

Interface system 125 is described in greater detail hereinafter with respect to FIGS. 1B and 1C, and generally comprises an interface exchange 130, a provider terminal 110 and a user terminal 112 in communication via an interface network 120. Interface network 120 provides message based communications between provider terminal 110 and user terminal 112 and interface exchange 130. In alternative embodiments, interface network 120 provides for communication between provider terminal 110 or user terminal 112 and interface exchange 130, but not between provider terminal 110 and user terminal 112. In some embodiments, interface network 120 comprises a TCP/IP compliant virtual private network (VPN). However, it should recognized that other communication networks could be used to provide similar functionality. For example, interface network 120 could be the Internet, a local area network (LAN), a wide area network (WAN), a telephone network, a cellular telephone network, a virtual private network (VPN), an optical network, a wireless network, or any other similar communication network.

Figure 1B:
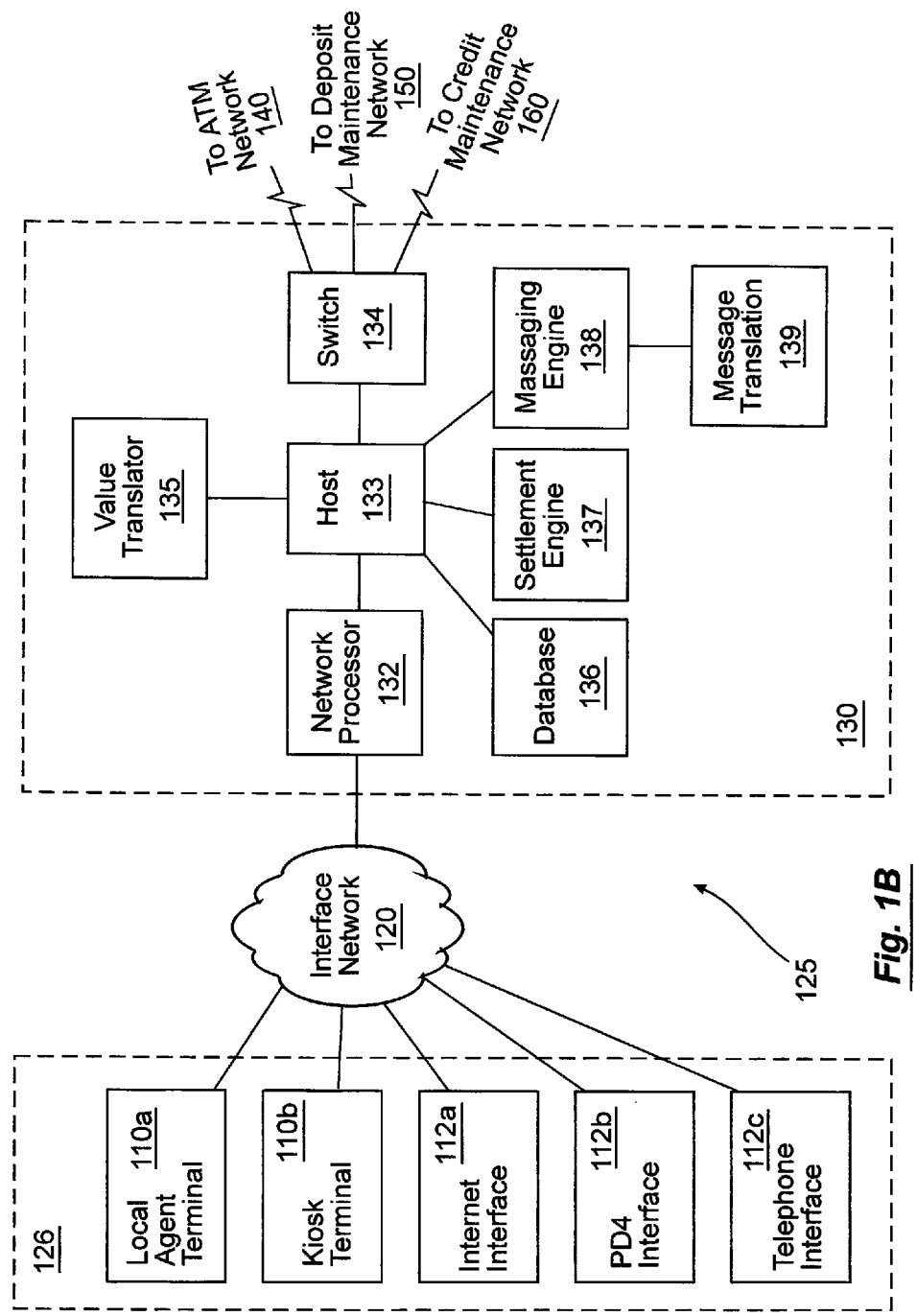
FIG. 1B illustrates an interface system of the network of FIG. 1A.

Referring to FIG. 1B, interface system 125 is described in greater detail. Interface system 125 provides access into transfer system 100 and permits a wide variety of payment instruments to be used to receive payments. For example, money to transfer may be made by presenting cash, checks, stored value cards, credit cards, debit cards, cash cards, by an ACH transfer from a bank account, and the like. To accommodate such payment instruments and types, various input devices 126, such as terminals or interfaces may be used. For example, a local provider terminal 110a may be used to accept cash, credit cards, checks, debit cards, stored value cards and smart cards. Such terminals may also be used at the payout end to print a check or money order, or to credit a cash card or stored value card. Examples of such terminals are described in copending U.S. application Ser. No. 09/634,901, entitled "POINT OF SALE PAYMENT SYSTEM," filed Aug. 9, 2000 by Randy J. Templeton et al., which is a nonprovisional of U.S. Prov. Appl. No. 60/147,899, entitled "INTEGRATED POINT OF SALE DEVICE," filed Aug. 9, 1999 by Randy Templeton et al, the complete disclosures of which are herein incorporated by reference.

A kiosk terminal 110b may also be used and will be described with reference to FIG. 1C. In so doing, it will be appreciated that terminal 110b may be used to make payments to a recipient as well as to receive money from a sender. Terminal 110b includes a controller 200 that communicates with various devices such as a computer 202, a PDA port 204, a telephone 206, a card reader 208, a card writer 210, a card issuer 212, a message issuer 214, a cash issuer 216, and a check printer 218. Terminal 110b may include some or all of these devices. Computer 202 may include standard computer components as is known in the art, such as a screen display, one or more input devices, such as a keyboard, a pointing device, a touch screen, a speaker for voice recognition, and the like. In this way, various information regarding the money transfer may be input into the transfer system. Computer 202 may communicate with interface network 120 using a variety of communication techniques including via an internet interface 112a, a dedicated telephone line, and the like. Conveniently, computer 202 may include a web browser to produce web pages as is known in the art. Hence, with computer 202 a user may input the payment type, such as a credit or debit card number, stored value account information, loyalty program account information, and the like, along with information on the recipient. This information may then be processed by interface exchange 130 to complete the transaction.

PDA port 204 permits a PDA device to be coupled to terminal 110b. In this way, a transfer may be made directly from the sender's PDA which may conveniently be preprogrammed with various information relating to the transaction, such as account numbers, information on the recipient, and the like. In this way, transactions may be made in a manner similar to that using computer 202, but with the sender's personal PDA device. If needed, controller 200 may communicate with a PDA interface 112b in order to communicate with interface network 120.

Telephone 206 permits transactions to be staged by voice. For example, by using a telephone interface 112c, various aspects of the transfer transaction may be given over telephone 206. For example, telephone 206 may be used to call a customer service representative to have a transaction staged. The sender may then receive a transaction number that may be given to a provider when presenting the money to transfer. The provider may use this number to access the staged information, thereby speeding up the transaction. Alternatively, such a transaction may be accessed at computer 202 by inserting the number to permit the staged transaction information to be accessed. Payment information may then be obtained at kiosk 200, such as by inserting cash, a check, a credit, debit or smart card, or the like into an appropriate reader. As an alternative to using a customer service provider, the transaction information may be entered using an IVR system that records the information and submits it to interface network 120.

Telephone interface 112c may also be used to permit cell phone users to access the transfer system. In this way, cell phone minutes or other stored values associated with the cell phone may be transferred using system 100. Further, telephone interface 112c permits money to be withdrawn from the transfer system. For example, a phone may be used to make a request to have money withdrawn from a bank account, credit card account, stored value accept, or the like. This may be done by calling the bank account or credit card organization directly and requesting a withdrawal at a given location. The bank or credit organization may then contact interface exchange 130 to make the funds available at the requested location, such as at a local provider terminal.

As another example, a cell phone may be used to access a point of sale device, kiosk, local provider terminal or the like using a telephone interface of one of those devices. A request may then be made to interface exchange 130 for the funds. A value or foreign currency conversion may be performed by interface exchange 130 as described herein and an authorization may be sent back to the location where the request was made to payout the funds. In this way, a person in a foreign country may easily access cash by simply locating a provider, kiosk or the like, using a cell phone to request money, and then receiving the payment in the local currency. Optionally, a verification step may be required, such as by requesting the entry of a PIN to ensure the correct recipient is receiving the money.

Card reader 208 may be used to enter a variety of information. For example, a sender may have a card with various pre-stored transaction information, such as the sender's name, identification number, payment instruments, and the like. These may be used to populate a transaction screen on kiosk 110b. Card reader 208 may also be used to read information from credit, debit, smart and stored value cards. In this way, a sender may provide the system with the money or value to transfer simply by inserting the card with the desired account information into card reader 208. Further, reader 208 may be used to read information from an ID or payment card of a recipient who is to receive a transferred value.

Card writer 210 permits information to be encoded and stored on a variety of cards. For example, information on each transaction may be stored on a customer card of the sender. Card writer 210 may also be useful when the kiosk serves to pay money or value to a recipient. For example, writer 210 may be used to add value to a stored value or smart card of a recipient.

In some cases, cards may be issued to either a sender or a recipient using card issuer 212. For example, a customer card may be issued to a sender who registers with the system. Card issuer 212 may also be used to issue cards when making payments to recipients. For example, card issuer 212 may issue stored value cards, smart cards, cash cards and the like. These may be used at other kiosks or ATMs to withdraw the transferred money or value.

Message issuer 214 permits a message transmitted from a sender to be provided to a recipient. Message issuer 214 may be used to produce the message on a display screen of computer 202 or to print the message which is dispensed to the recipient.

Cash issuer 216 is used to dispense cash to a recipient. In this way, a recipient may receive a cash payout from a kiosk which has been sent from a sender using any of the techniques described herein. The cash payout may be made once the recipient is properly identified, such as by inserting a customer card into card reader 208 and optionally by entering a PIN. Cash payouts may also be made by inserting a card having a stored value that is stored within interface exchange 130. In this way, once a recipient that has been issued a stored value card, the recipient may take that card to any kiosk for partial or full payment. Further, conversions may be made when making the withdrawal. For example, a recipient may have a stored value card with cell phone minutes, and may request that these be converted to cash. Also, foreign currency conversions may be made. Such a transaction is facilitated by interface exchange 130 as described herein.

A sender may also access the money transfer system using his or her own communication devices. For example, by using an internet interface 112a, transfer system 100 may be accessed by any type of computer that is capable of accessing the internet. Information on the payment instrument or type may then be communicated to transfer system 100 through the internet. Such payment instruments or types include credit cards, debit cards, stored value cards, cash cards, ACH bank transfer information, and the like. As another example, a PDA interface 112b may be used to permit PDA devices to communicate with transfer system 100. Similar payment instruments and payment types may also be presented using PDA interface 112b. Another example is through a telephone interface 112c. In this way, communications may be made over the telephone, to a customer service representative, through an IVR system, and the like. Similar to the other interfaces, a wide variety of payment instruments and types may be communicated into the system through this interface, including credit cards, debit cards, stored value cards, cash cards, ACH bank transfer information, and the like.

After passing through interface network 120, the information regarding the transfer is sent to interface exchange 130 that has a network processor 132 to process the data. This is then sent to a host 133 that may communicate with a value translator 135, a database 136, a settlement engine 137 and a messaging engine 138 that in turn may communicate to a message translator 139. The information received by interface exchange 130 may include information on the sender, information on the recipient, the type and amount of payment, a desired location to transfer the money, and the like. In some cases, a value translator 135 may be needed to change the type of value. For example, value translator 135 may do a foreign currency conversion, or may transfer from one type of value to another, e.g. frequent flier miles to dollars. All information that is processed may conveniently be stored in database 36.

Settlement engine 137 may be used to facilitate the crediting and debiting of various accounts during a transfer. For example, if a sender requests that funds from a credit card account be used in the transfer, settlement engine 137 is used to contact the credit network to charge the card and to manage the fees involved in the transaction. Such fees may be those charged by the credit organization as well as internal fees that are a part of the money transfer transaction. Settlement engine 137 may be used in a similar manner when crediting or debiting checking accounts, stored value accounts, customer loyalty points and the like.

In some cases, the sender may also wish to send a message with the money. Such a message may be a simple greeting, business or legal terms, and the like. Messaging engine 138 is employed to convert the message to the proper format depending on the type of output device that is to be used with receiving the money. For example, the output device may be a printer that physically prints the message onto some type of media. Alternatively, the message may be temporarily displayed on a display screen, such as on a kiosk, ATM machine, point of sale device, an e-mail, a web page or the like. The sender or recipient may also indicate that the message needs to be translated to a different language. In such cases, message translator 139 may be used to translate the message into the other language. This may be accomplished by simply doing a word look up for each corresponding word in the other language. More complex language translation capabilities may also be used.

Once the transfer request is properly processed, it is sent by a switch 134 to the appropriate network as shown. This may be to ATM network 140, deposit maintenance network 150 and/or credit maintenance network 160 to complete the transaction. As described hereinafter, in some cases the entire money transaction may occur without assistance from any of these networks, such as when transferring money between one stored value account and another. Optionally, the transaction may also make use of central exchange 170 which may comprises the Federal Reserve System, an association of banks, such as NACHA, a cell phone network, or the like.

With such a configuration, a wide variety of payment options are possible. For instance, the sender may request that the funds be withdrawn from a sender's bank account. In such as case, interface exchange 130 communicates with depositing maintenance network 150 to make the withdrawal. This transaction may also involve central exchange 170. Once the funds have been withdrawn, they may be retrieved by the sender using a wide variety of techniques. For example, the funds may be paid out to the recipient by delivery to a provider location, at a kiosk, at a point of sale device, at an ATM, via the internet using a stored value account, at the recipient's bank account after a Fed wire or an ACH transfer, by a stored value card or a smart card, by a cash card, and the like.

As one specific example, a sender may request that the money be available for pick-up at an ATM or a bank. In such cases, the money may be deposited into a recipient's bank account using deposit maintenance network 150. One example of such a system for transferring money into a recipient's bank account is described in copending U.S. application Ser. No. 09/516,209, filed Feb. 29, 2000, the complete disclosure of which is herein incorporated by reference. However, other systems may also be used. Central exchange may facilitate this transaction by doing a wire to the bank accounting using the Federal Reserve System, by an ACH transfer, or the like. In this way, the money may be retrieved using an ATM, by visiting the bank, or by any other withdrawal technique offered by the bank. For example, payment may be made by cash, by a printed check, by crediting a smart card or stored value card, or the like. This may be done by providing the ATM or other payout device, such as a kiosk, with the appropriate equipment for making such payments. As another example, interface exchange 130 could maintain a stored value account for the recipient. Funds may then be withdrawn from ATM 114 using any of the techniques described herein, and the account debited once ATM network 140 communicates with settlement engine 137. Also, once a stored value account has been created, the funds may be withdrawn using a wide variety of other techniques, such as by depositing them into a bank account of the recipient, by crediting a credit card account of the recipient, and the like.

If a credit card is involved in the transaction, either for sending or receiving, credit maintenance network 160 may be accessed. For example, if the sender uses a credit card, interface exchange 130 accesses credit maintenance network 160 via settlement engine 137 to approve the funds and to send a request to charge the credit card account. Once the funds are available, they may be paid out to the recipient using a wide variety of techniques, such as by delivery to a provider location, at a kiosk, at a point of sale device, at an ATM, via the internet using a stored value account, at the recipient's bank account after a Fed wire or an ACH transfer, by a stored value card or a smart card, by a cash card, and the like in a manner similar to that described herein. The payment may also be credited to the recipient's account by having settlement engine 137 send it a credit request to credit maintenance network 160.

Check printer 218 may be used to print a check to a recipient. In this way, payouts may be made in the form of a check. Although not shown, an imager may also be used to scan checks so that money to be transferred may be input in the form of a check. Printer 218 may also be used to print a receipt for a given transaction.

As shown in FIG. 1C, kiosk controller 200 may also be configured to communicate directly with ATM network 140. In this way, the kiosk may function as an ATM in addition to being able to perform money transfer functions as described herein.

It will be appreciated that some or all of the components of kiosk 110*b* may be incorporated into other devices that are used to access system 100. For example, such components may be used in a provider terminal, a point of sale device, an ATM machine, and the like. Further, kiosk 110*b* may be configured to communicate with a local provider terminal 110*a* as shown in FIG. 1C to communicate with interface network 120.

Figure 1D:
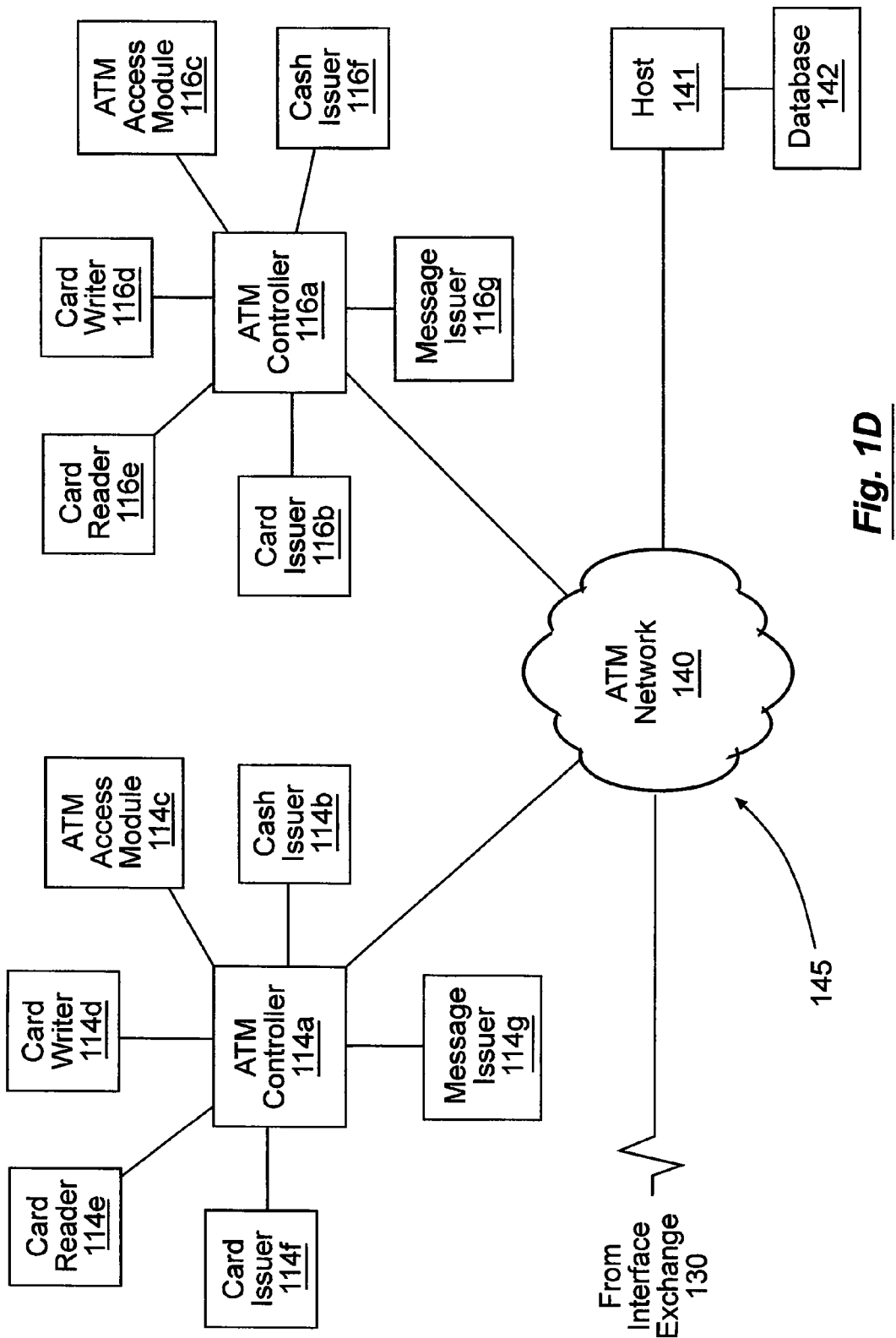
FIG. 1D illustrates an ATM network included in the network of FIG. 1A.

Referring to FIG. 1D, ATM system 145 will be described in great detail. ATMs 114 and 116 each include a controller 114*a* and 116*a*, that are coupled to cash issuers 114*b* and 116*b*, ATM access modules 114*c* and 116*c*, card writers 114*d* and 116*d*, card readers 114*e* and 116*e*, card issuers 114*f* and 116*f* and message issuers 114*g* and 116*g*. Cash issuer 114 is employed to dispense cash to a recipient based on a previous transfer. Access module 114*c* provides access to the ATM using a variety of components, such as a touch screen, a keyboard, a voice recognition system, and the like. In this way, various information regarding a transfer request or a pick up may be entered into controller 114*a*. Card writer 114*c* and card reader 114*e* permit various information to be written onto various cards and read from various cards in a manner similar to that previously described in connection with kiosk 110*b*. Card issuer 114*f* permits various cards to be issued in a manner similar to that previously described in connection with kiosk 110b. Message issuer 114g permits various messages to be provided to the user in a manner similar to that described in connection with kiosk 110b.

The ATMs communicate with each other over ATM network 140. ATM system 145 includes a host 141 that is coupled to a database 142 to facilitate the processing and storing of data that is transferred between each ATM. With such a configuration, money transfers may be made between ATMs simply by coupling to interface exchange 130. For example, information about a transfer may be input into ATM 114 using access module 114c and optionally also card reader 114e. The request is sent from ATM network 140 to interface exchange 130 which processes the transaction in a manner similar to that previously described. The money may then be withdrawn by the recipient at any other ATM simply by accessing the ATM through access module 114. The transferred money may then be dispensed from cash issuer 114b.

The ATMs may also be used as a payout device in connection with any of the other transfer techniques described herein. For example, money to be transferred may be provided using any of the input devices 126. A request may also be made to have the money available at an ATM. The money may then be retrieved from the ATM, either by debiting the account stored at interface exchange 130 or by depositing the funds into a bank account of the recipient as previously described.

Figure 2:
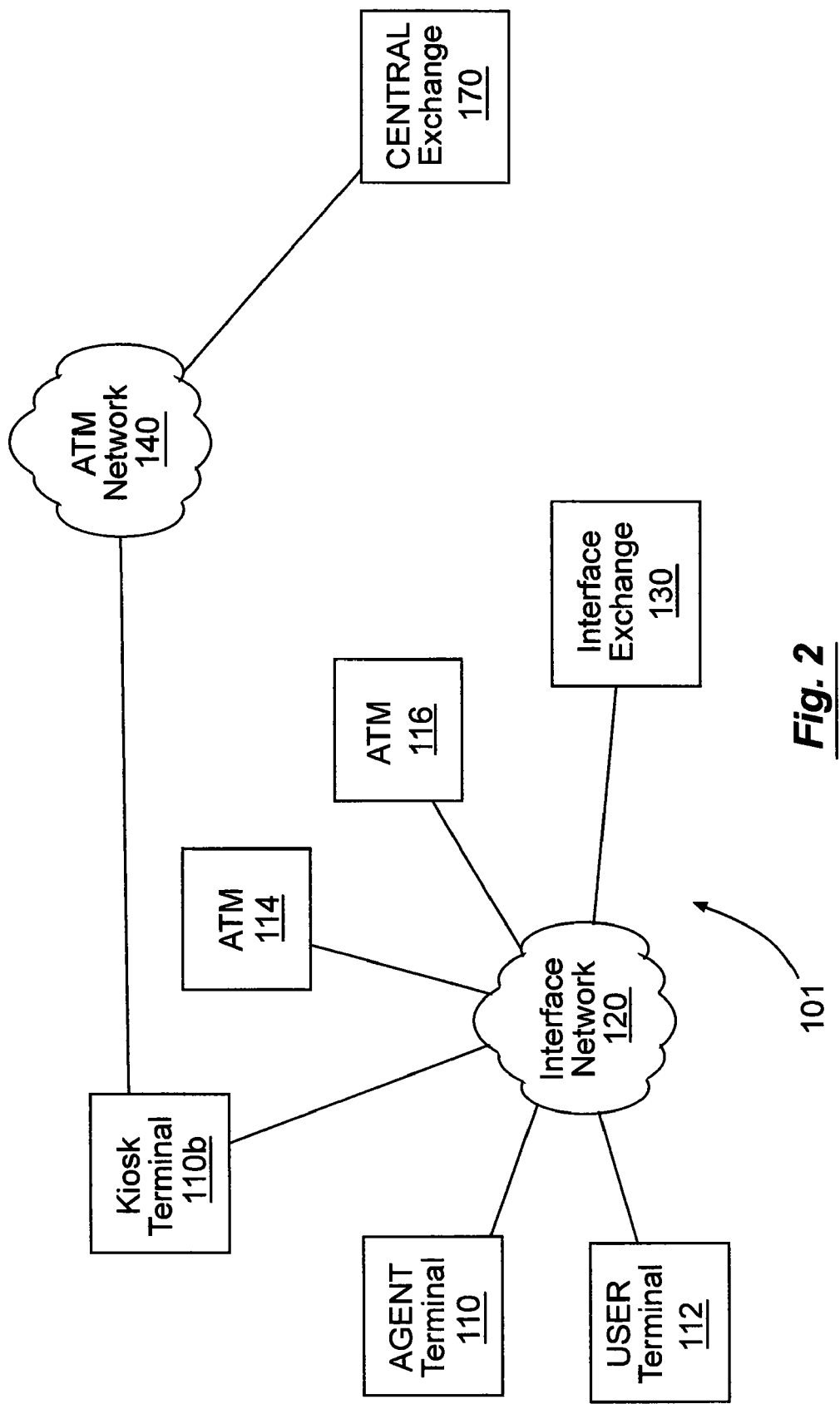
FIG. 2 illustrates an alternative embodiment of a transfer network according to the invention.

It should be recognized that other embodiments of transfer system 100 are possible according to the present invention. For example, another embodiment of a transfer system 101 is illustrated in FIG. 2. In this embodiment, transfer system 101 comprises provider terminal 110, user terminal 112, kiosk terminal 110b, and ATM's 114, 116 in communication via interface network 120. Interface exchange 130 exchange functionality previously described in relation to FIG. 1B. Each of kiosk terminal 110b and ATM's 114, 116 can communicate via ATM network 140 to central exchange 170. In this way, transfers as previously described involving central exchange 170 can be accomplished without a direct interface between interface exchange 130 and ATM network 140 or other networks. Rather, such transfers can be accomplished by providing dual communication functionality in kiosk terminal 110b and/or ATM's 114, 116.

Figure 3:
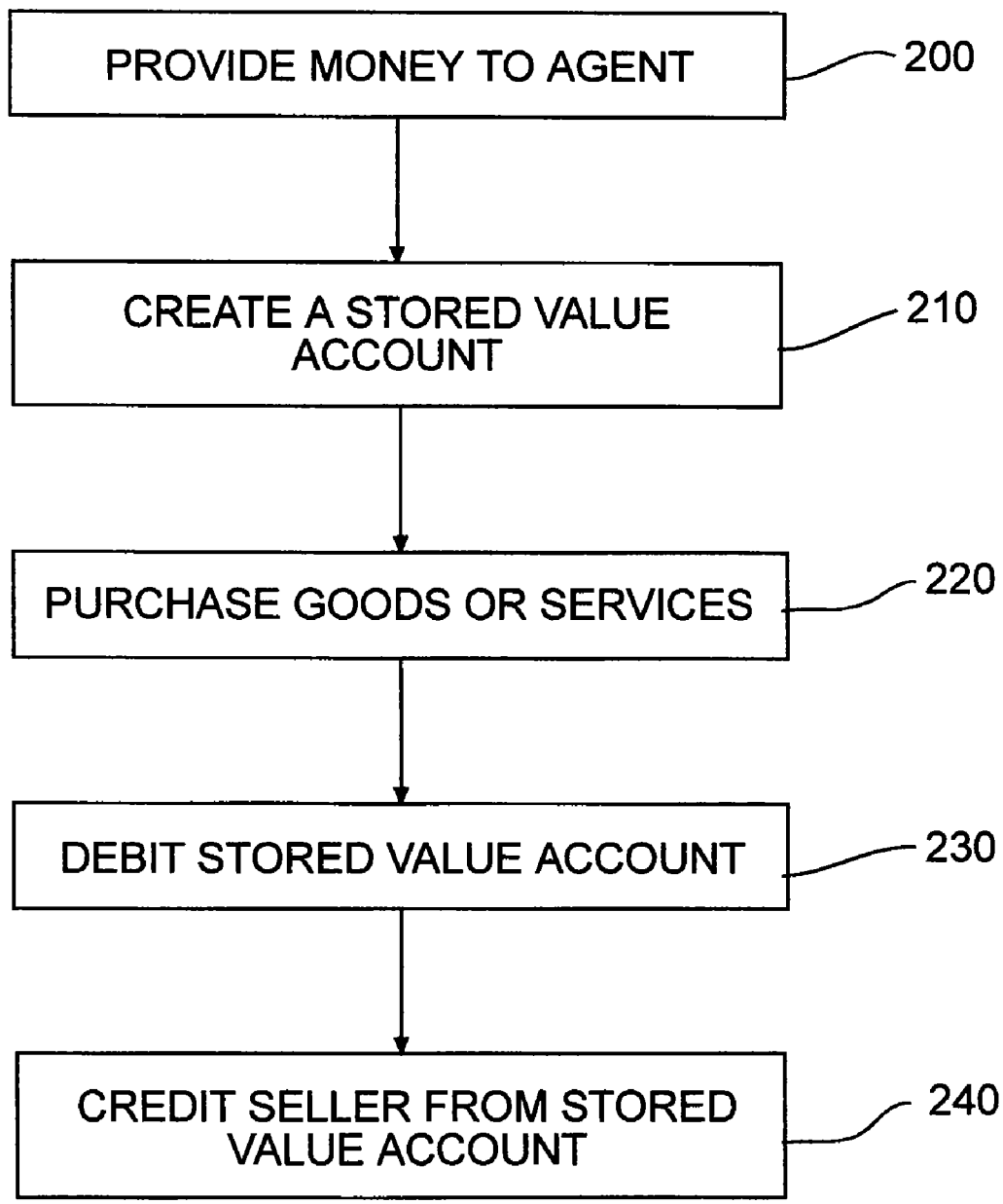
FIG. 3 is a flow chart illustrating one method for transferring money using a stored value account according to the invention.

Referring now to FIG. 3, one method for transferring money using the transfer system previously described will be set forth. Such a method is particularly useful in creating a stored value account that may be used to make internet or other electronic payments without disclosing any account information to the seller or recipient. As shown in step 200, a user provides the money to a provider of the money transfer system. This payment may be made in any form accepted by the provider who keeps this information confidential. The payment information may be input into the local provider terminal (see FIG. 1B). As shown in step 210, a stored value account is credited with this payment. This may occur within interface exchange 130 (see FIG. 1B). The money may be placed into the stored value account by having the sender designate the user's stored value account, or the user may contact interface exchange 130 and request that the funds be placed into the user's stored value account. The user may then make a desired purchase as shown in step 220. As one example, the purchase may be made over the internet When payment is requested, the user may access his stored value account, using for example, internet interface 112a (see FIG. 1B). One convenient way to permit the stored value account to be used for payment is to provide a link at the seller's web site to the web site managing the stored value account. Information on the transaction may then be provided to permit the stored value account to be debited as shown in step 230 and to credit the seller as shown in step 240. This transaction may be performed using settlement engine 137 of interface exchange 130 (see FIG. 1B). A wide variety of seller accounts may be credited, including a checking account, a credit card account or a stored value account using techniques previously described.

One advantage of such a method is that information about both a buyer and a seller may be kept confidential. For example, a buyer may pay money into the system which is transferred to the seller, without any knowledge of the buyer if the buyer chooses. In a similar manner, any data on the seller may be kept from the buyer.

In one alternative, money paid into the system may be at the request of a recipient. For example, money may be paid in to obtain a stored value card or to pay for services, such as a pre-paid telephone service. In such cases, the user may be prompted to enter how much money is to be paid. For example, the message may be that $50 is required in order to prepay for telephone minutes. The information is provided into the system from the recipient. The sender may also be provided with the option of varying the amount that is paid in, along with the addition of a message.

Figure 4:
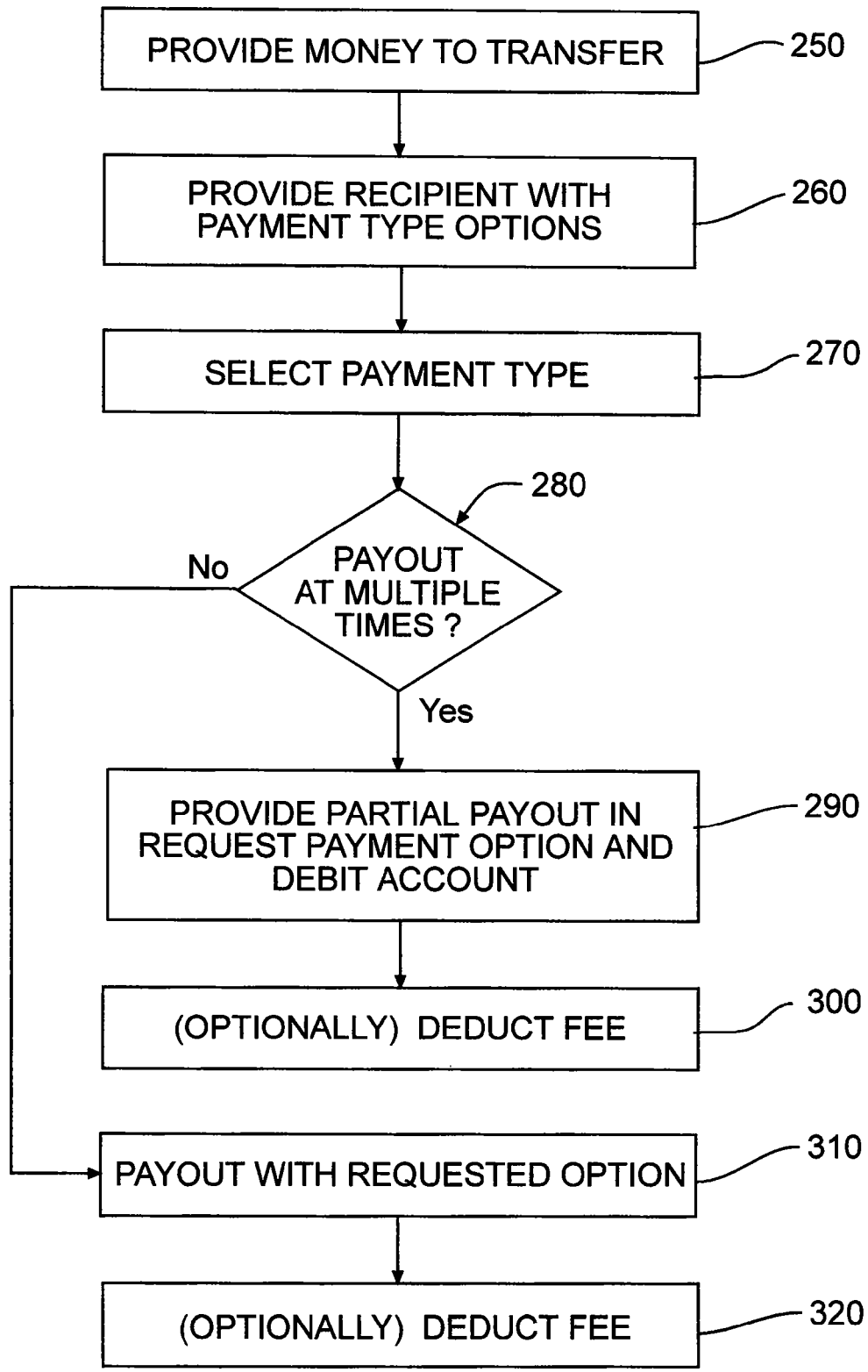
FIG. 4 is a flow chart illustrating one method for transferring money using various payment types and times according to the invention.

FIG. 4 illustrates a method for transferring money where the recipient has the option of receiving the money in different payment types and at different times. The process begins at step 250 where the money to be transferred is entered into the money transfer system. Conveniently, the sender may have the option of sending a message along with the money. This may be received in any language requested by the sender or the recipient using the message translator 139 (see FIG. 1B). In some cases, the message may be separate from the money transfer. For example, the money may be electronically transferred to a recipient's bank account while a message is sent to a printer or to a computer of the recipient to notify the recipient of the transfer. This may be useful, for example, when making a payment of aggregated bills. The payments may be aggregated and sent to the recipient's bank account, and a separate receipt sent to the recipient giving the details of each payment.

When ready to receive the money, the recipient accesses the money transfer system using any of the techniques described herein. The recipient is provided with a variety of payment options as shown in step 260. This may be, for example, payment in cash, check, money order, a stored value card, a deposit into a checking account, a credit to a credit card account, or the like. Further, the recipient may request payment in any currency or other type of stored value using value translator 135 (see FIG. 1B). For example, if living in Mexico, the recipient could request payment in Pesos, and could also request that any message be delivered in Spanish. The recipient selects the payment type as shown in step 270 and is then provided with the option of receiving a full payment, or partial payments over time as shown in step 280. If full payment is selected, the process proceeds to step 310 where full payment is made according to the requested payment type. Optionally, a fee may be charged according to the payment type as shown in step 320. If a partial payment is selected, the process proceeds to step 290 where a partial payout is made according to the requested payment type and the stored value account is debited. A fee may optionally be deducted as shown in step 300. At any time, the recipient may again access the money transfer system to receive the rest of the transferred money.

One specific use of partial payouts in combination with a currency conversion is to permit an international traveler to receive money in one or more countries in one or more payments made in the local currency. For example, a U.S. resident may decide to travel to several countries during a business trip and may need to obtain local currencies in each of those countries. In so doing, the traveler may not want to receive or convert to the local currency too much of all of their funds at a time. To facilitate such a need, the invention permits travelers to send money to themselves (or another traveler) prior to (or even after) departure. This money may be picked up in the currency of their destination(s). Such a process facilitates the transfer of the traveler's funds for convenient withdrawal in limited or convenient increments during their travel, and in the local currency.

Conveniently, the customer may accomplish this by performing a money transfer transaction, and then receive all or only portions of the initial transfer upon arrival at the destination. Fees may be determined on the amount withdrawn as well as a currency determined at the time of withdrawal. In this way, money may be received in multiple countries and in multiple currencies based on the same money transfer transaction. As such, the need for carrying excess cash or travelers checks may be greatly reduced or eliminated.

The cash pick ups may conveniently be performed at a money transfer location, such as at a Western Union location. Such a process permits a traveler to pick up money in a local currency, at a known exchange rate, and at any one of a large variety of money transfer locations.

Such a process may be performed using any of the money transfer systems described herein. For example, as illustrated in FIG. 1B, the money transfer request and payment may be input using any of the input devices 126. As one example, local provider terminal 110*a* may be used to receive payment information as well as information on the recipient and countries of interest. Such information may be transmitted to host 133 for storage.

When ready to make a withdrawal, another local agent terminal 110*a* in the foreign country may be accessed. Alternatively, any of the access devices, including networks 140, 150 or 160 could also be used. The request is received at host 133 that determines an exchange rate using value translator 135 and also calculates any fees. This information is transmitted back to terminal 110*a* to allow for the payout. Host 133 may also keep a record of the transaction and any remaining principal that is stored in database 136. If needed, host 133 may also compare an identifier with one on record to confirm the correct recipient.

The fee structure for the client may be weighted so that upon placing the funds into the system, a nominal fee is charged to cover expenses. The traveler may be charged at each pick-up location a determined or a predetermined amount based on how much money they are receiving. For example, the fee for withdrawing $1,000 may be $20. If the traveler decides to withdraw $100, the fee may be 100/1000×$20, or $2. The payout amount plus the fee amount may be subtracted from the total available principal upon enacting each payout.

Hence, to place money into the system, any of the interfaces described herein may be used. As one specific example, a customer may place money into the system by going to a money transfer location and providing appropriate information regarding the transfer. This may conveniently be accomplished by filling out a form a providing the form to the customer service representative at the money transfer location, or by having the customer enter this information into a computer. Such information may include customer identification information, sender identification information (if different from the customer), countries in which the money should be made available, payment information, and the like. The customer may also provide some type of identification that they will use to pick up the funds on the payout side. This identification number may be input into the system as well. The entered information is transmitted to a host computer system using any of the techniques described herein.

The host computer may be arranged in a manner similar to any of the host systems described herein. The host system may store the money traveler transactions in a queue that is separate from any other types of transactions, such as regular money transfer transactions. Further, the money traveler transactions may have a separate product code attached to them. In one aspect, the host computer system may store the fields in the transaction record, and may include fields such as [country], [country], [country], [country], [country], [ID Number], and the like.

The host computer system may also be configured to allow for the 'splitting' of transactions. This allows for partial payments of the total available principal. In addition, the host computer system may be configured to deduct partial payout amounts plus fees from the total principal. Further, the host computer system may periodically receive exchange rates for each of the countries of interest. These may be stored at the host computer system and used when performing a currency conversion at the time of payment. In some cases, this information may be transmitted to the payout computer where the currency exchange calculations may occur.

When paying money into the system, a wide variety of communication devices may be used. For example, information on the transaction may utilize a point of sale device, a personal computer, a kiosk or the like that may transmit information to the host computer system as well as display information. As previously described, types of information that may be input include possible receiving countries, an identification number, a payment amount, and the like.

A similar type of computer may be used on the receive side of the transaction. The payout computer may be programmed to have a payout mode that allows the traveler to input information needed to withdraw the money. For example, the payout computer may be configured to prompt the customer service representative to check the identification of the recipient. This may then be compared against the identification transmitted from the host to the payout computer. For extra security, the recipient may be asked to enter their identification which may then be compared at the host computer with the identification on record.

Conveniently, the host computer system may transmit to the payout computer the amount of principal remaining for withdrawal. Upon selection of a payment amount, this information is transmitted back to the host for the calculation of any fees and to perform a currency conversion (although some of all of these tasks may be performed at the payout computer). The recipient may then be paid the amount by the customer service representative who may enter the payment information into the payout computer. The remaining principal is then reduced by the amount of the withdrawal and any fees. Conveniently, this information may also be presented to the recipient on a display screen, on a receipt, or the like. Optionally, the payout computer may be used to generate a receipt that contains the payout amount as well as the remaining balance in the account.

Another feature is the ability to provide the traveler with information on locations where the funds may be obtained in each designated country. This information may be supplied to them on a receipt provided upon inputting the money into the system. For example, telephone numbers (toll free) may be supplied for each country in which they are travelling, so the traveler has a communications link to know where to get their funds. Alternatively, pick up locations may be downloaded to a PDA or other device in electronic form.

As one specific example, a traveler may receive funds input into the system by first travelling to one of the designated countries. Optionally, the traveler may call a number to determine where nearest pick up locations are located. The traveler then proceeds to one of the locations where the customer service representative looks up the transaction based on identification information provided by the traveler, such as the traveler's name. The traveler may then be asked to supply their identification with is confirmed by the customer service representative or by the host computer system. The traveler informs the representative how much they want to receive of the amount which is then paid to the traveler.

As an alternative to requiring the recipient to provide identification, the recipient may be provided with a personal identification number (PIN) that is entered during pick-up. This permits the traveler to pick up money, even if they have lost their identification. As another option, the PIN may be used as identification when contacting a customer service representative in case the traveler's identification is lost or stolen. As a further option, the customer may be provided with a call in number, web site, or the like that may be used to confirm pick-up points before departing.

In some cases, the customer may wish to recharge the amount of principal. This may be accomplished, for example, by permitting the traveler to authorize automatic debits from their checking account. This information may be supplied at the initial transaction, or at a subsequent time. When ready to transfer funds the user may access a VRU 'PIN based' system that allows the consumer to authorize debit transactions from their checking account to be placed into their account in the host computer system.

Figure 5:
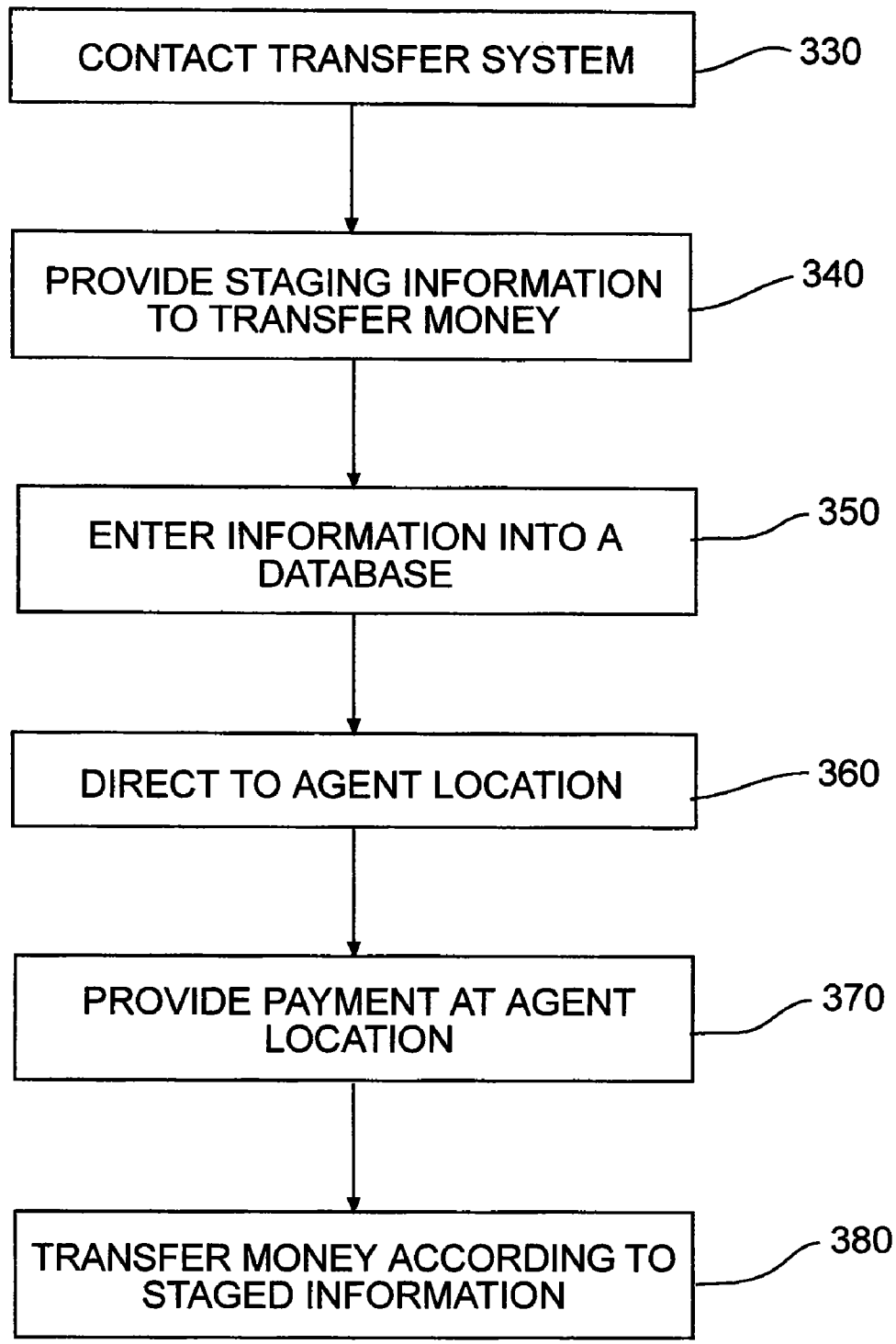
FIG. 5 is a flow chart illustrating one method for staging a money transfer transaction according to the invention.

FIG. 5 illustrates a method for staging money transfer transaction information into the transfer system before presenting payment at a physical location in order to reduce the transaction time or simply to assist in the transaction. For example, a customer may access the money transfer system through the internet or a customer service representative. In some cases, the sender may not qualify for a credit card payment or may simply experience a difficulty in completing the transaction. In such cases, the process proceeds by contacting the transfer system as shown in step 330. The information needed to stage the transaction is then provided as shown in step 340 and then stored in a database as shown in step 350, such as within interface exchange 130 (see FIG. 1B). Optionally, the sender may be giving a transaction number or other identifier and is then directed to a provider location as shown in step 370. The sender provides this information to the provider who enters this into the system, such as by using the local provider terminal 110a (see FIG. 1B). This causes the corresponding record in the database to be accessed and sent to the provider terminal to automatically populate fields on the screen. All the sender is then required to do is to provide the proper payment to the provider. The money may then be transferred using any of the techniques described herein as shown in step 380.

Further, it will be appreciated that a variety of other transfer methods may be performed using the transfer system described herein. For example, to expedite a money transfer transaction, senders may be provided with customer cards having staging information stored on the card. Such information may include, for example, the sender's name, account number, contact information and the like. This card may then be read using the provider terminal 110a (see FIG. 1B) to populate the fields displayed on the display screen. The sender may then present payment along with information on the recipient.

In some cases, the recipient may wish to withdraw the transferred money from an ATM. However, in order to access existing ATMs, a user must present some type of card. As such, after a transaction is sent, the transfer system may deliver an ATM access card to the recipient by some type of mailing method. A separate mailing may optionally be done to provide a PIN to the recipient. This card may include information that is readable by the ATM to permit access so that the money may be withdrawn. Such cards may also function as cash cards or other type of stored value cards so that the money may be withdrawn based on information supplied by the card, rather than by accessing the money transfer system. As another option, the ATM may be configured to be accessed with any type of card, such as a driver's license, ATM card credit card, and the like. Once accessed, a home screen may be displayed that permits access to interface exchange 130 (see FIG. 1B) to complete the money transfer as previously described.

The transfer system may also find use in cases where individuals do not have a credit or debit card to make internet purchases. In such cases, a customer may go to a provider location and purchase a cash card (that may be a physical or a virtual card, i.e. an identification number) using local provider terminal 110a (see FIG. 1B). The cash card is used by the money transfer system as a pointer to a record of the money paid by the customer into the system and that is available for transfer. Hence, after making an internet purchase, the customer may provide the seller with information from the cash card. The seller then presents this information to the money transfer system which checks the information and then transfers the money to the seller using any of the techniques described herein.

In some cases, interchange fees may be used when making transfers using a credit card. To avoid such fees, a money transfer may be made using a check, debit card, an ACH transfer to a bank account or the like. In such cases, the payment may be made at a provider location, over the internet, or using other techniques described herein. The money transfer system then waits for the funds to paid before making the funds available. Once available, the recipient may receive the funds in cash from the money transfer system, such as by picking up the funds at a provider location.

As another example, a deliverer of goods may use the transfer system to reduce or eliminate the amount of cash received and carried during daily deliveries. Currently, when delivering goods, the delivery person is provided with payment at each location where goods are delivered. The cumulated payments are then deposited at the end of the day. However, the delivery person faces the risk of being robbed or of misplacing the payments during the daily activities. According to the invention, the transfer system is able to use a point of sale terminal, such as the local provider terminals 110a (see FIG. 1B) to credit a stored value card carried by the delivery person. In this way, each time a delivery is made, the card is presented to the buyer who updates the card with a credit using the terminal. The transfer system is also able to debit a stored value of the buyer, or may ask for some other form of payment that is entered into the terminal. When required, such as at the end of the day, the delivery person may take the stored value card to his own terminal to update the credits into the transfer system. Of course, payouts may be made using any of the techniques described herein, including crediting of bank or credit card accounts, payment of cash from an ATM, and the like. By using such a card, the delivery person does not need to carry large amounts of cash throughout the day.

The transfer system may also be used to facilitate business to business transactions as well. For example, a merchant may keep a computerized record of their accounts payable using software known in the art. Periodically, multiple payments may be made by simply loading the accounts payable information into the money transfer system, such as by using a connection to the local provider terminal 110a or through internet interface 112a (see FIG. 1B) along with a request to have the payments made. These payments may be made using any of the techniques described herein, including by cash, credit card, debit card, stored value account, or the like. Using messaging engine 138 (see FIG. 1B), a message may also be sent to each recipient giving information about the account. Each recipient may also be given the option of taking payment in any of the payment forms as described herein. Conveniently, the merchant may have recipient profiles stored within the transfer system, so that payments may automatically be made according to the profile each time a request is made.

Hence, the payment systems of the invention are configured to provide a wide variety of techniques for presenting funds from a money transfer receive transaction to a customer. These include, for example, the use of a closed-loop debit card that may be used at customized ATMs for cash or in-lane purchases if within a subscribing network. For instance, a debit card may be loaded with funds and then used within a network of a given retailer or association of retailers to make purchases. Further, an anonymous debit card may be used, such as those offered by MasterCard, VISA, Discover, and the like. In such cases, funds may be provided to a money transfer location to set up an account. A card may then be initialized and provided to the recipient with a PIN or other identifier. Other types of cards that may be used to receive funds include stored value cards, pre-paid phone cards, pre-paid internet cash cards and the like.

When funds are paid out in connection with a card, the recipient's card may be presented to any of the terminals described herein, such as a POS device, which communicates with interface exchange 130. The terminal reads the number off of the card to associate the card account with the transferred funds. For example, a recipient may enter identification information, such as their name, into a POS device to access the record of the funds to be paid. The card may then be swiped on the POS device to read the card number and to permit the card account number to be associated with the funds. The funds may then be credited to the account using any of the techniques described herein. In some cases, the sender may dictate that the funds are to be paid out in the form of a stored value card. The sender may also indicate the type of value to be stored on the card, e.g., money, phone minutes, and the like.

As another option, the card number may be assigned dynamically by the host system, such as interface exchange 130, and then a receipt issued to the recipient that contains an account number. For example, a terminal, such as a POS terminal, may issue a paper receipt or a sticker that may be placed onto a card or other media and which contains the account number. Value from the account number may be redeemed using interface exchange 130 using any of the techniques described herein.

The payment systems of the invention may also be used to pay funds to a bank account of the recipient using a MICR number from one of the recipient's checks. For example, the recipient may submit the MICR number to interface exchange 130 using any of the interfaces described herein, including a POS device having a reader. In this way, the recipient may receive the funds by entering identifying information into the POS device and then swiping the check through the POS device to read the MICR line. Once the account information is read, it is transferred to interface exchange 130 where the funds may be deposited into the recipient's account using the techniques described herein. Similar techniques may also be used to transfer funds to the recipient's bank account using the recipient's debit card. For example, the recipient's debit card may be swiped at a POS terminal to create a reverse or return transaction where the recipient's account is credited with the transferred funds. Interface exchange 130 may make use of deposit maintenance network 150 to perform this transaction in a manner similar to that previously described.

As another example, payment funds may be automatically transferred to an on-line investment account or an on-line bank account. This account may be maintained by an investment service or bank that may access interface exchange 130 using any of the techniques described herein. The funds may be transferred into this account in a variety of ways. For example, the sender may designate the recipient's account so that when information on the payment reaches interface exchange 130, switch 134 (see FIG. 1B) routes information on the payment to the investment service or bank where the funds may be deposited into the designated account. Alternatively, a recipient may have a record in database 136 that any funds to be received from any source, or from specific sources, be transferred automatically to the on-line account. As another example, a record of the funds transfer may be maintained at interface exchange 130 until the recipient is notified and then specifies that the funds should be placed in the on-line account. The actual transfer of funds may be made using any of the techniques described herein, such as by an ACH transfer.

In a similar manner, funds may be transferred to an account of an on-line purchase service. In this way, transferred funds may be accessed by a user to make purchases using an on-line auction or purchase site.

Finds may be transferred to a person's bank account using a reverse or return transaction. For example, a user may present their debit card along with payment at a location having a POS device. The card is read by the POS device, and a reverse or return transaction is performed to credit the bank account associated with the debit card. In this way, the funds may be automatically credited to the user's bank account.

Another technique for paying out funds is by having the sender generate a sender key at the time of payment. This sender key may be transmitted to interface exchange 130 using any of the techniques described herein. Alternatively, the sender key may automatically be generated by interface exchange 130. The sender then provides the sender key to the recipient using any technique, such as, for example, by telephone, e-mail, regular mail, facsimile, in person, or the like. Optionally, the sender key may be stored on some type of media, such as a card, that is sent to the recipient. Interface exchange 130 also generates a confirmation code. This confirmation code may be accessed by the recipient by interfacing with interface exchange 130 using any of the techniques described herein. With the sender key and the confirmation code, the recipient may access an ATM, kiosk or the like that is coupled to interface exchange 130 and receive a cash payout at the ATM or kiosk. For example, the recipient may access ATM 114 of ATM network 140 to receive a payout. Conveniently, a card may be inserted into the ATM to gain access to the ATM functions or to provide the ATM with the sender key. Optionally, the payment made at the ATM or kiosk may be in any of the forms described herein, including the crediting of a stored value card, the crediting of a bank account, or the like.

When receiving payment, a variety of techniques and equipment may be used to facilitate entry of information relating to the payment. For example, a MICR reader may be used to read a MICR line from a check of the recipient to permit interface exchange 130 transfer the funds to a bank account of the recipient. A card reader may be used to read the magnetic stripe from a card containing information on an account of the recipient. This information may be transmitted to interface exchange 130 to permit such an account to be credited. A keypad or keyboard may also be used to permit account information to be entered. For example, a keyboard may be used to enter recipient account information into a web site or other on-line screen for on-line or internet accounts that are to receive the funds. Another option is the use of an OCR scanner or other reader to permit OCR or other account information, such as bar codes, to be read into the system. For example, a recipient may wish to use the transferred funds as payment for an outstanding bill, such as a loan payment, phone or utility bill. In such cases, the account information may be scanned off of the bill or invoice and sent to interface exchange 130 that may transmit the funds to the holder of the outstanding bill using any of the techniques described herein. Still further, various biometrics equipment may be used to identify an existing customer that is tied to an account. Examples of biometrics that may be read include facial recognition, fingerprint, retinal or iris scanning, and the like. This information may be transmitted to interface exchange 130 that may include an engine determine the recipient and then perform a look-up in the database to determine the recipient's account. The funds may then be transferred to this account.

Another feature of the invention is the ability for either a sender or a recipient to receive information on what value is in the system and available for sending or receiving. Hence, when interfacing with the system using any of the interfaces (such as interfaces 110, 112, a kiosk, an ATM, an IVR system, a computer, a PDA, and the like) a user may enter identification information and then receive a summary of what value is in the system. For example, a sender may access the system and receive information as to previous transfers, pending transfers, transferred but unclaimed value, and value stored in a stored value account. Other information that may be provided includes information on why the value was input, such as for a money transfer, for a stored value account, for bill payment, and the like. As another example, information may be provided on the status of the input or on the form of payment used when the value was input into the system, such as by cash, credit card, money order, check or the like. The time that the money was input may also be included.

On the receiving side, the recipient may receive information such as transferred value that remains in the system, a summary of value transferred out of the system, and the like. Other information that may be provided includes where the funds originated, the time of transfer, and the like.

Once logged into the system, either a sender or a recipient may receive information on how the value may be transferred or withdrawn from the system. This information may be provided in summary form having a global list of options, or may be one or more recommended options based on input from the sender or recipient. One example of how such information may be provided to a sender is illustrated in FIG. 6.

Figure 6:
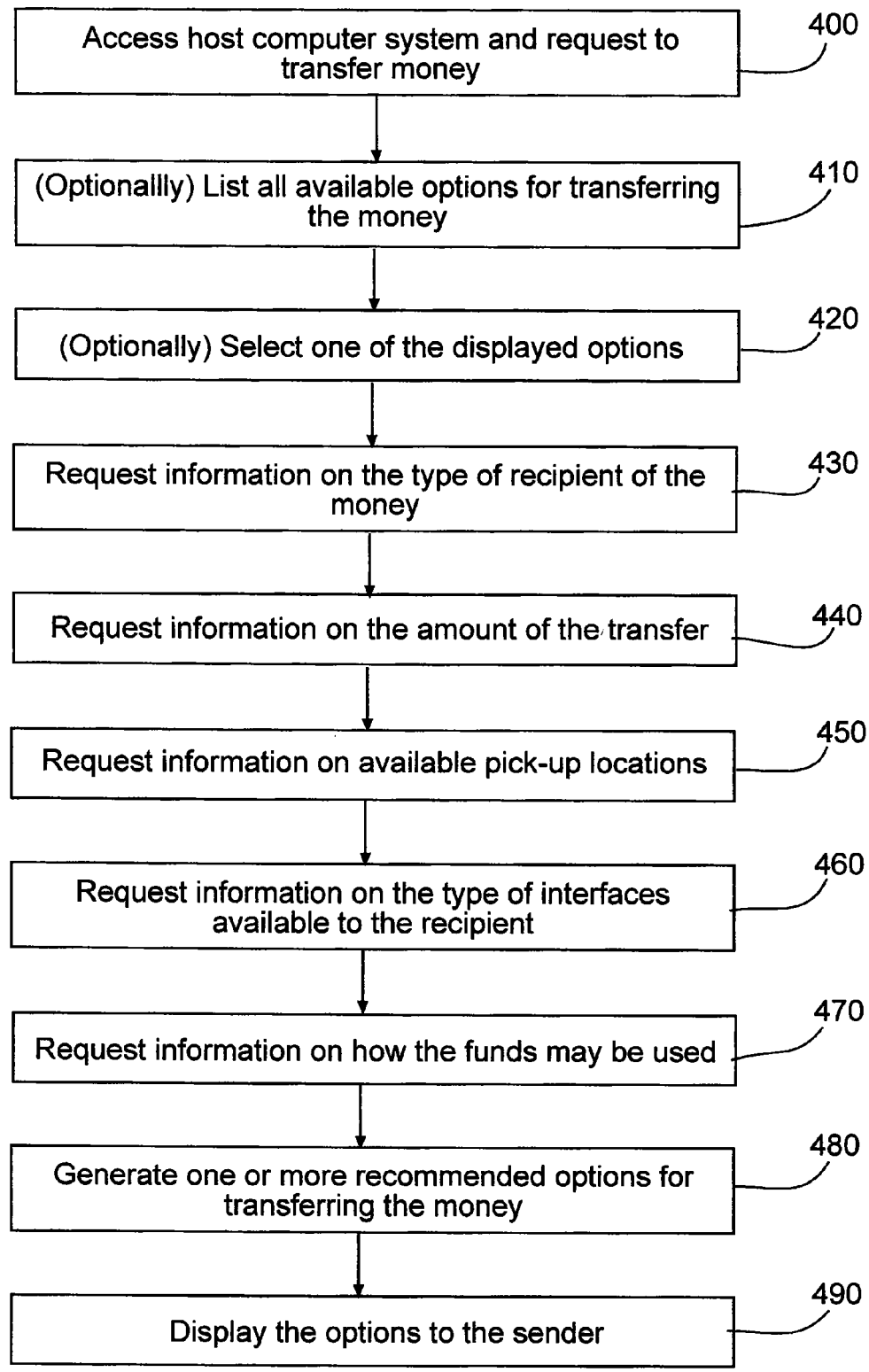
FIG. 6 is a flow chart illustrating one method for eliciting information on a transfer and providing a recommended way for making the transfer.

In FIG. 6, the sender accesses the host computer system using any of the devices described herein and requests to transfer money or value as shown in step 400. Optionally, the host system may list all available options for transferring the money as shown in step 410. Such a list may include any of the value transfer options described herein, such as a payment by money order, a transfer to an account of the recipient, payment onto a card, or the like. Optionally, the sender may select one of the displayed options as shown in step 420 and proceed in accordance with the selected option.

Alternatively, the sender may be prompted for various types of information on the transfer so that the host system may recommend one or more options. These may include, but are not limited to, requesting information on the type of recipient of the money as shown in step 430. Conveniently, a box for keying this information may be provided, or predetermined types may be selected from a drop down menu. For instance, the sender may select types such as a family member, a coworker, a charity, a retailer, or the like. As shown in step 440, the sender may also be requested to enter information on the amount of the transfer. This may optionally be keyed in, or selected from a drop down menu. The sender may also be asked for information on available pick-up locations as shown in step 450. For instance, the sender may select from a list of pick-up locations, such as a specific postal code, city, country, or the like. Further, as shown in step 460 the sender may be asked for information on the type of interfaces available to the recipient. Such interfaces may include, for example, a money transfer location, a personal computer, an ATM, a financial kiosk, a bank or credit union, or the like. Optionally, other types of information relative to a value transfer may also be requested. For example, as shown in step 470 the sender may optionally be asked about the intended use of the funds.

Using the information provided by the sender, the host computer system processes the information to generate one or more recommended options for transferring the money as shown in step 480. The host computer system may have logic and look-up tables to determine such options based on standard inputs. These may then be displayed to the sender as shown in step 490. For example, if the recipient does not have a personal computer, the recommended option may be to pick-up the funds at a brick and mortar location, such as a money transfer location. Alternatively, the option may be to a stored value account that the recipient may access from an ATM machine or a kiosk. If the recipient is located in a rural area, the option may be to generate and mail or hand deliver a money order. As a further example, if the intended use of the funds were for a particular store, the recommended option may be for a stored value card accepted by the store. Conveniently, the options may be displayed in text form to the sender or verbally communicated. For instance, the recommended option may state: We recommend an in-person pick up in cash at a money transfer location that is located at 123 Vine Street, Los Angeles, Calif.

Such a process may also be used when the transfer of value is to be used to pay an amount due, such as for bill payment. For example, at a remote computer, point of sale device, PDA, cell phone, or the like, a customer may enter a request to pay a bill. The customer (or a customer service representative) may be asked to enter information needed to process the bill payment, such as the customer's account, the amount to be paid, the type of payment instrument, and the like. This information may then be transmitted to the host computer system in a manner similar to that discussed in other embodiments. An account associated with the payment instrument may be evaluated to insure that sufficient funds are available to pay the bill. For example, the host computer system may perform a pre-authorization step by evaluating a checking account, a savings account, a credit card account, a stored value account, or the like.

Also, the host computer system may transmit to the remote computer (or such information may be stored at the remote computer), a list of payment options that are available using the desired payment instrument. In some cases, payment options using other types of payment instruments may also be suggested. Such payment options may include, for example, a real time guaranteed funds payment by receiving cash at a third party location which guarantees payments of the funds to the biller, an ATM debit (with or without a PIN), an ACH transfer, payment by check, or the like. A list of fees for each of these options may also be provided to the customer.

Once the customer approves an option and has provided a type of payment that has been authorized, the host computer system may facilitate processing of the payment. This may take place by requesting that a payment account be debited so that the funds may be transferred to the biller. Various intermediate accounts may be used to store and forward the funds as needed. The appropriate fees may also be deducted. Further, the customer may be provided with a receipt showing the form of payment used, the fees charged, and a confirmation that the payment was made.

Figure 7:
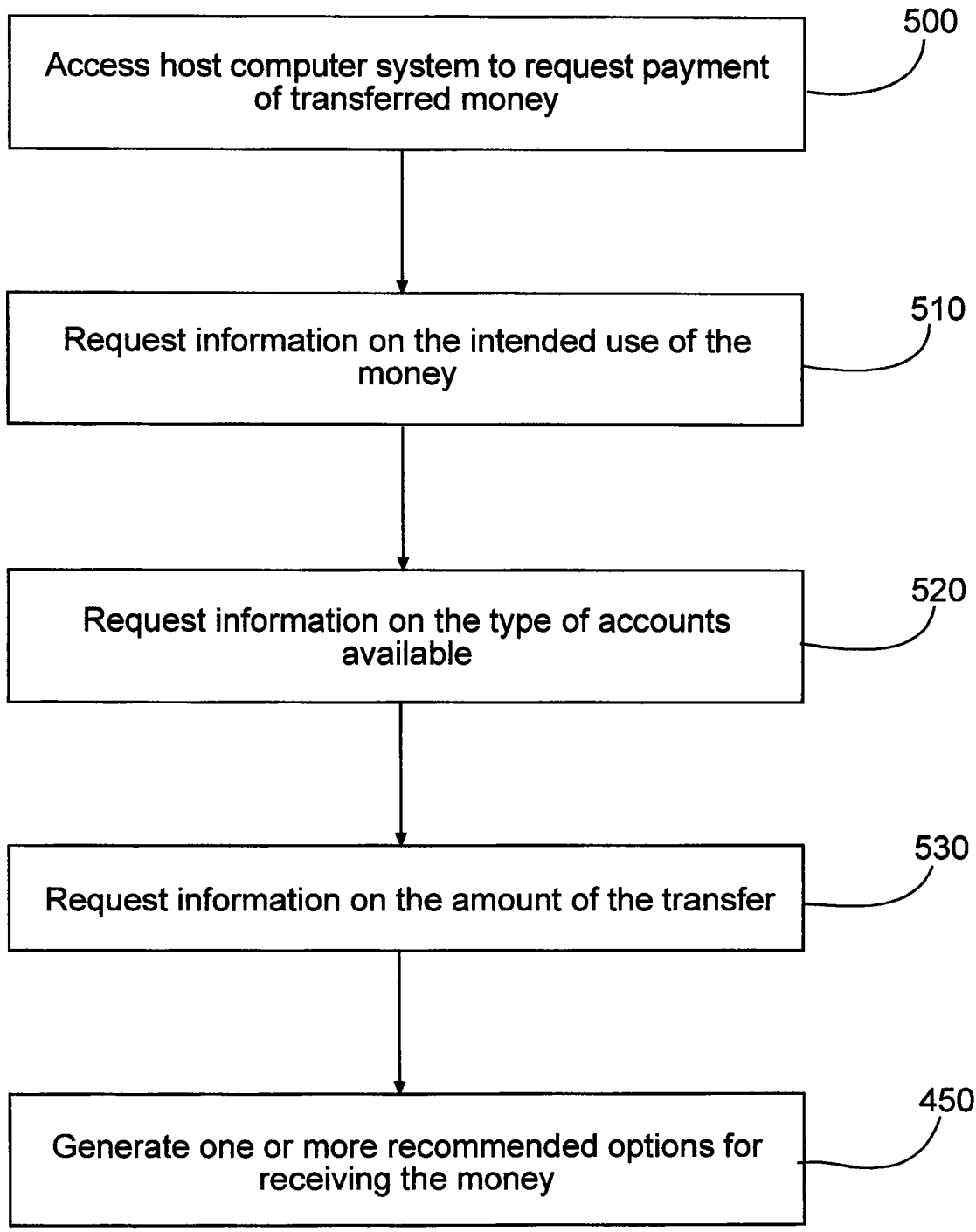
FIG. 7 is a flow chart illustrating one method for eliciting information on how a transferred value is to be used and for providing a recommended way to use the transferred value.

A similar process may be used at the recipient side to provide recommended options for receiving the funds. For example, as shown in FIG. 7, the recipient may access the host computer system to request payment of transferred money as shown in step 500. The recipient may be provided with a list of all available payment options, or may be prompted to enter information that will be used to generate one or more recommended payment options. For example, as shown in step 510, the recipient may be asked for information on the intended use of the money. The recipient may also be asked for information on the type of accounts available to the recipient as shown in step 520. Such accounts may include any of those described herein, such as bank accounts, credit accounts, investment accounts, stored value accounts, and the like. As shown in step 530, the recipient may also be asked for information on the amount of the transfer. Other questions regarding the payment may also be asked. The host computer systems takes these inputs and generates one or more recommended options for receiving the money as shown in step 540. The host computer system may include logic and look up tables that match recommended options based on the inputs. These are then displayed or verbally communicated to the recipient. For example, if the recipient does not have any account and the intended use is a cash payment to a friend, the recommended option may be a cash payment at a money transfer location. As another example, the recipient may have a checking account and wishes to use the funds to pay for a service by check. In such a case, the recommended option may be a transfer of the funds to the recipient's checking account.

Another embodiment of the invention relates to restrictions that may be made relative to the payment of funds. Such restrictions may be limit the types of payments that may be made at the time of withdrawal, or may place restrictions on how the funds are paid when the payment is made to multiple recipients. For example, the sender may designate that the funds must be paid out to a debit card, stored value card, phone card, gas card, or the like. Further, the sender may place restrictions on how much of the transferred funds may be withdrawn from the system over time, e.g., the recipient may withdraw no more than $50 per week until the money has all been withdrawn. For multiple recipients, the sender may place restrictions, such as the amount that each of the recipients is entitled to withdraw, or may require that some or all of the recipients must be present when making the withdrawal. Alternatively, any of the recipients may withdraw any of the amount at any time.

Figure 8:
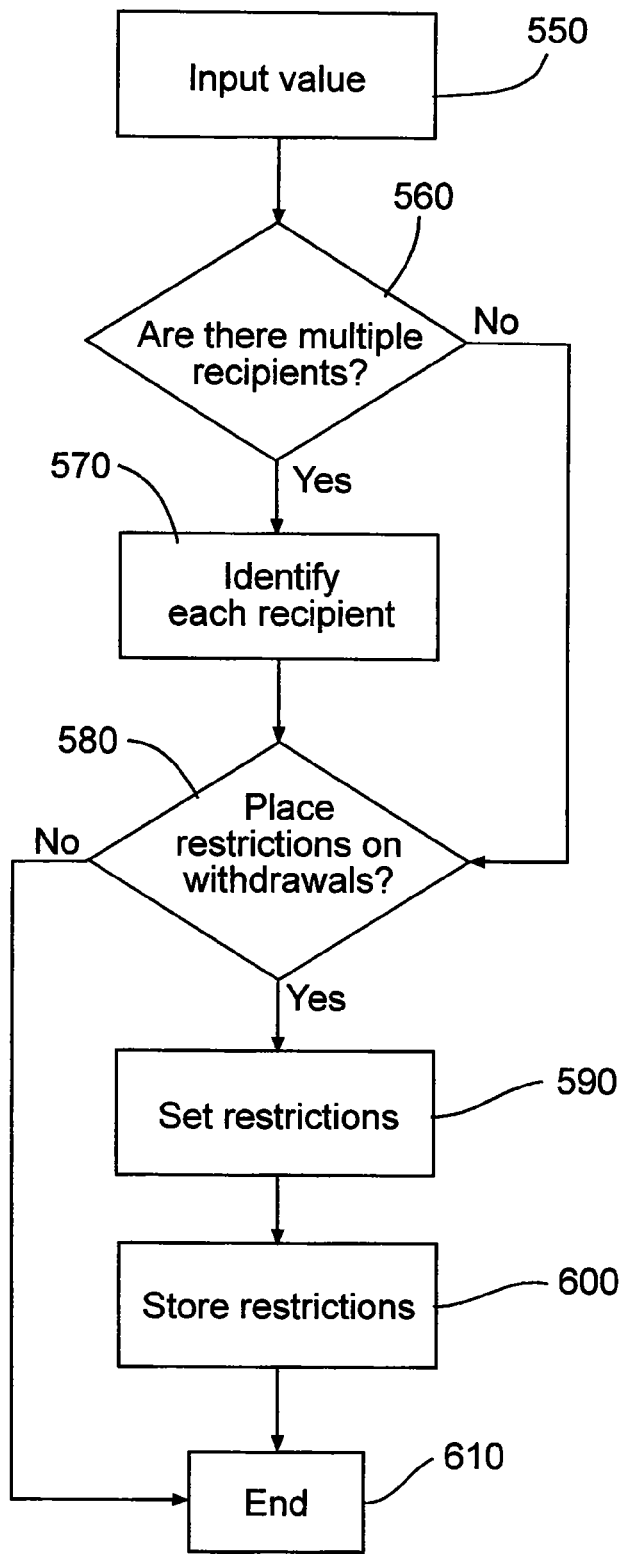
FIG. 8 is a flow chart illustrating one method for replacing one or more restrictions on a transfer of value.

Referring to FIG. 8, one embodiment for placing such restrictions will be described. As shown in step 550, the sender initially inputs value into the system using any of the techniques described herein. The sender may then be prompted as to whether the sender wishes to send the funds to multiple recipients as shown in step 560. If so, the process proceeds to step 570 where the sender may designate multiple recipients that may withdraw the funds from the system. The sender may also be asked whether the sender wishes to place restrictions on the withdrawals as shown in step 580. If so, the process proceeds to step 590 where the sender inputs any desired restrictions. Such restrictions may conveniently be selected from a menu displayed to the sender or verbally recited using an IVR system. These restrictions are stored by the host computer system as shown in step 600, and the process ends at step 610. When an intended recipient accesses the system to withdraw funds, the withdrawal may be restricted based on the limitations set by the sender. For example, the sender may require that all recipients be present before funds may be withdrawn. If only one of the recipients tries to withdraw the funds from a money transfer location, the clerk will receive a message that all recipients must be present and may decline payment of the funds. As another example, the limitation may be that the funds be placed on a phone card. If the recipient requests cash at a money transfer location, the request may be denied, and the recipient be provided with the phone card.

Many individuals, small entities or business, or the like may have a periodic or short term need to receive multiple payments or money transfers. However, because of such limited use, such individual or entities may not wish to set up a commercial account with a traditional money transfer service, and the cost of doing so may be cost prohibitive. The systems of the invention may accommodate such a need by permitting such individuals or entities to use the money transfer system with certain restrictions. For example, the accounts may be limited by time, amount transferred, the number or transfers, or the like, alone or in combination. Further, such accounts may be certain performance requirements, such as transactions minimums.

As one example, an individual may have 15 items to auction off over the internet The individual will only accept guaranteed funds. The items may be those that are particularly appealing to cash customers, so the individual needs a cash settlement method. Further, the individual needs to insure that the fees for such a service are economically viable. By establishing a special relationship with the money transfer systems of the invention with certain restrictions, such as for no more than 15 transactions over a certain time period, the seller is able to offer a cash settlement method to potential buyers. Further, the funds may be deposited directly into the seller's account with a reasonable fee.

Such a method may be used for internet auctions, fundraisers, situations involving a limited number of purchases, such as classifieds, and the like. Further, such a method may be implemented using the internet, by a faxed applications, by a phone call, or by any of the techniques described herein.

Figure 9:
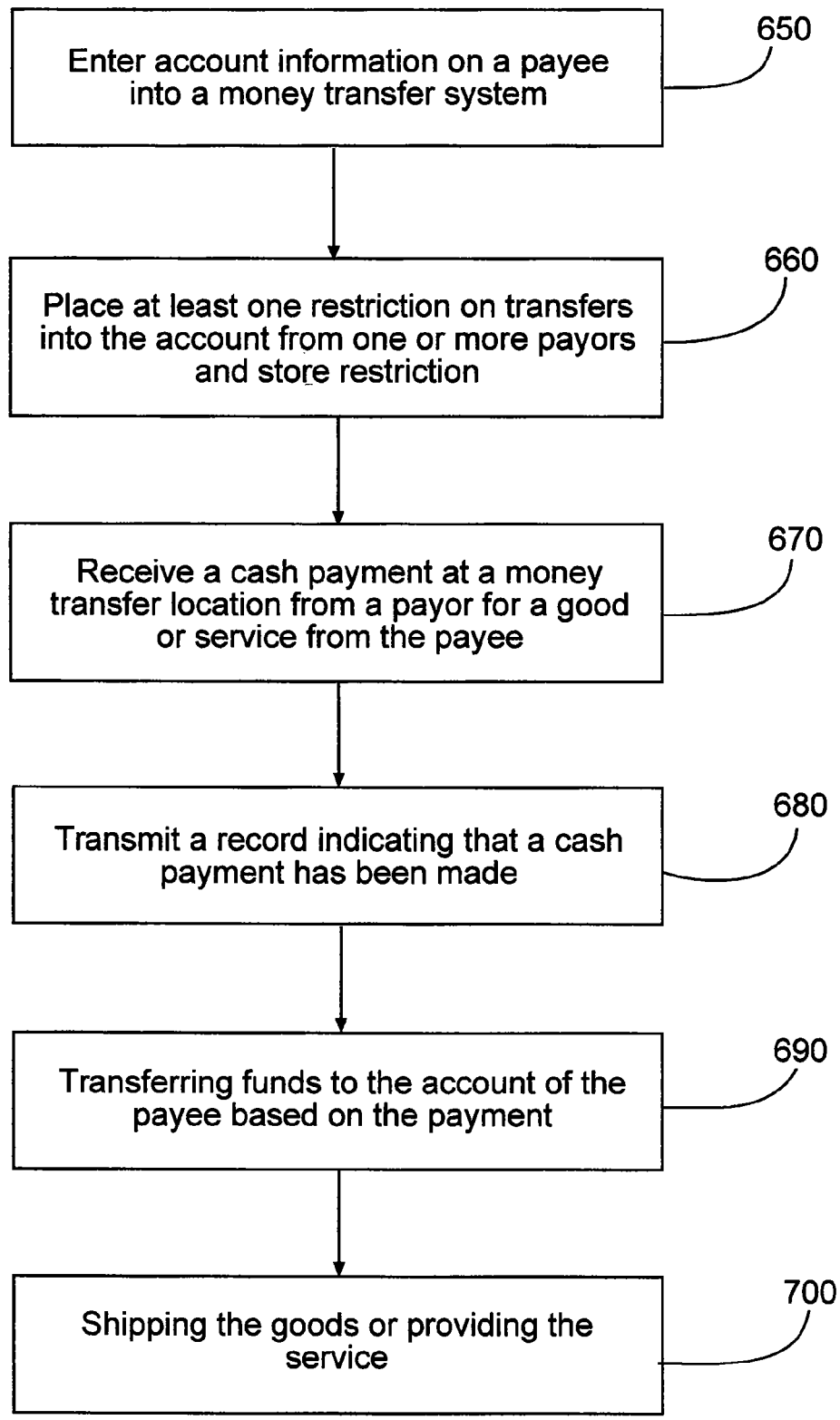
FIG. 9 is a flow chart illustrating a method for paying for goods or services using a network according to the invention.

Referring now to FIG. 9, one method for paying for goods or services in such a manner will be described. At step 650, account information on a payee may be entered into a money transfer system. The money transfer system may be any of those described herein, and the information may be entered electronically, such as over the internet, by fax, by a phone call, or the like. This information may include the name of the payee, the payee's preferred method of payment, such as a direct deposit into an account of the payee, and the like. Further, the payee agrees to place one or more restrictions on transfers into the account from one or more payors as shown in step 660. This information may then be stored using the money transfer system. Such restrictions may be the amount of the transfers, the number of transfers, the time during which transfers may be made, and the like.

Once the relationship is established, cash payments may be made at a money transfer location from payor for good or services offered from payee as shown in step 670. In this way, good funds are ensured by collecting cash for the payment. When payment is made a record indicating that a cash payment has been made may be transferred to the payee using the money transfer system as shown in step 680. This notification may conveniently be sent electronically, such as by an e-mail. Further, funds may be transferred to the account of the payee for the payment. As such, the payee or seller is able to receive good funds for each of the purchases. As shown in step 690, the seller may ship the goods or provide the services offered by the seller.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

What is claimed is:

1. A method for transferring money deposited in a first country for withdrawal at money transfer locations in a second, different country, where the different country may have a different currency than the first country, wherein the deposited amount is to be withdrawn in portions at the money transfer location, and wherein the method comprises:

receiving and storing at a host computer system money transfer information comprising recipient identification information, the second country, and the deposited amount in an originating currency;

in response to receiving the second country at the host computer system, providing second country transfer information for use by a recipient in making withdrawals in the second country;

providing a customer service representative (CSR) assisted money transfer location where the deposited amount may be withdrawn;

receiving at the host computer system a request transmitted from the CSR assisted money transfer location to withdraw a portion of the deposited amount in a local currency of the country of the money transfer location; and storing a record at the host computer system of the amount of each portion withdrawn and any exchange rate used to convert the withdrawn amount to the local currency.

2. A method as in claim 1, further comprising:

providing at the host system a stored value account having an account number, wherein the account number comprises the recipient identification information; and associating the deposited amount with the stored value account.

3. A method as in claim 2, further comprising:

providing a presentation instrument for use by the recipient in making withdrawals, and wherein the account number of the stored value account number is stored on the presentation instrument.

4. A method as in claim 1, further comprising storing at the host computer system a record of any fees charged on the amount withdrawn.

5. A method as in claim 1, wherein the recipient information comprises the recipient's name and an identification number, and wherein the request includes an identification number from the recipient, and further comprising comparing the identification numbers to authorize the withdrawal.

6. A method as in claim 1, wherein the request includes the name of a sender, and wherein the sender and the recipient are the same, so that the sender has access to the payment amount when traveling in the different country.

7. A method as in claim 1, further comprising transmitting, from the host computer system to the CSR assisted money transfer location in the second country, receipt information needed to provide a receipt to the recipient.

8. A method as in claim 7, wherein the receipt information comprises an amount paid to the recipient, any fees, and a remaining balance of the payment amount.

9. A method as in claim 1, further comprising receiving and storing at the host computer system multiple different countries where the money may be received.

10. A method as in claim 1, further comprising:

notifying the recipient as to the remaining balance in the deposited amount.

11. A method as in claim 1, wherein the recipient information and deposited amount is entered by a sender at a self-service kiosk.

12. A method as in claim 1, wherein the second country information is withdrawal locations in the second country and the second country information is printed on a receipt provided at the time money is deposited in the first country.

13. A method for transferring money deposited in a first country for withdrawal at money transfer locations in a second country, where the second country may have a different currency than the first country, wherein the deposited amount is to be withdrawn in portions at the money transfer location, and wherein the method comprises:

receiving and storing at a host computer system money transfer information entered by a sender, wherein the money transfer information comprises recipient identification information, the deposited amount in an originating currency, and at least one second country where the money is to be received, and wherein the money transfer information is entered by the sender at a self-service kiosk;

in response to receiving the second country at the host computer system, providing second country transfer information for use by a recipient in making withdrawals in the second country;

providing a customer service representative (CSR) assisted money transfer location in the second country where the deposited amount may be withdrawn;

receiving at the host computer system a request transmitted from the CSR assisted money transfer location to withdraw a portion of the deposited amount in a local currency of the country of the money transfer location;

storing a record at the host computer system of the amount of each portion withdrawn and any exchange rate used to convert the withdrawn amount to the local currency; and notifying the recipient as to the remaining balance in the deposited amount after withdrawal of a portion of the deposited amount.

14. A money transfer system for permitting money deposited in a first country to be withdrawn in portions at money transfer locations in the first country or in a second country, comprising:

a host computer system that is configured to receive and store money transfer information entered by a sender, the money transfer information comprising recipient identification information and a payment amount in an originating currency;

wherein the host computer system is further configured to receive a request to withdraw a portion of the payment amount in a local currency from a customer service representative (CSR) assisted money transfer location, to deduct the requested portion from the payment amount along with any fees, to convert the requested portion to the local currency when withdrawn, and to store any exchange rate used to convert the withdrawn amount to the local currency;

wherein the money transfer information further comprises at least one second country where the money is to be received, and wherein the host computer is further configured to provide information pertaining to withdrawals in the second country in response to receipt of the second country information.

15. A system as in claim 14, wherein the host computer system is further configured to notify the recipient as to the remaining balance in the payment amount after withdrawal of the requested portion.

16. A system as in claim 14, further comprising:

a self-service kiosk for the sender to enter the money transfer information.

17. A system as in claim 14, wherein the host computer system is further configured to maintain a stored value account having an account number, wherein the account number comprises the recipient identification information, and to associate the payment amount with the stored value account.

18. A system as in claim 17, wherein a presentation instrument is used by the recipient in making withdrawals, and wherein the account number of the stored value account number is stored on the presentation instrument.

19. A system as in claim 14, wherein the host computer system is further configured to receive recipient identification information from the recipient and to compare the received recipient identification information with the stored recipient identification information.

20. A system as in claim 14, wherein the host computer system is further configured to transmit receipt information needed to provide a receipt to the recipient indicating the withdrawal.

21. A system as in claim 14, wherein the host computer system is further configured to transmit contact information for contacting money transfer locations in the country where withdrawals are to be made.

* * * * *